(12) United States Patent
Liu

(10) Patent No.: US 12,513,778 B2
(45) Date of Patent: Dec. 30, 2025

(54) COMMUNICATION METHOD AND APPARATUS

(71) Applicant: Huawei Technologies Co., Ltd., Shenzhen (CN)

(72) Inventor: Jun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/172,799

(22) Filed: Feb. 22, 2023

(65) Prior Publication Data

US 2023/0209649 A1 Jun. 29, 2023

Related U.S. Application Data

(63) Continuation of application No. PCT/CN2020/111933, filed on Aug. 27, 2020.

(51) Int. Cl.
*H04W 76/28* (2018.01)
*H04W 72/23* (2023.01)
(Continued)

(52) U.S. Cl.
CPC ........... *H04W 76/28* (2018.02); *H04W 72/23* (2023.01); *H04W 72/25* (2023.01); *H04W 72/40* (2023.01)

(58) Field of Classification Search
CPC ..... H04W 76/28; H04W 72/40; H04W 72/25; H04W 72/23
See application file for complete search history.

(56) References Cited

U.S. PATENT DOCUMENTS 12,185,413 B2 * 12/2024 Freda ................ H04W 52/0216
2017/0083335 A1 3/2017 Burger et al.
(Continued)

FOREIGN PATENT DOCUMENTS

| CN | 102932884 A | 2/2013 |
|----|-------------|--------|
| CN | 109479189 A | 3/2019 |
| CN | 111405610 A | 7/2020 |

OTHER PUBLICATIONS

Sony, "Discussion on sidelink resource allocation and configuration", 3GPP TSG RAN WG1 Meeting #90, R1-1712982, Aug. 21-25, 2017, 4 Pages, Prague, Czechia.

*Primary Examiner* — Raj Jain
(74) *Attorney, Agent, or Firm* — Slater Matsil, LLP

(57) ABSTRACT

According to embodiments, after a second communication device determines first information, the second communication device sends the first information to a first communication device, so that the first communication device determines second DRX configuration information between the first communication device and the second communication device based on the first information. The first information includes first DRX configuration information and/or first SL resource configuration information from the second communication device. When the first communication device determines the second DRX configuration information, the first communication device refers to the first information sent by the second communication device, so that when the first communication device determines a configuration parameter of the second DRX configuration information, the first communication device may refer to the first information that has been configured by the second communication device.

18 Claims, 10 Drawing Sheets

(51) Int. Cl.
  *H04W 72/25*  (2023.01)
  *H04W 72/40*  (2023.01)

(56) References Cited

U.S. PATENT DOCUMENTS

| | | |
|---|---|---|
| 2017/0272999 A1 | 9/2017 | Tsai |
| 2023/0007727 A1* | 1/2023 | Fan ........................ H04L 1/1896 |
| 2023/0063472 A1* | 3/2023 | Freda ................. H04W 52/0274 |
| 2023/0209649 A1* | 6/2023 | Liu ........................ H04W 76/28 |
| | | 370/329 |
| 2023/0380000 A1* | 11/2023 | Lee ........................ H04W 76/15 |

* cited by examiner

COMMUNICATION METHOD AND APPARATUS

CROSS-REFERENCE TO RELATED APPLICATIONS

This application is a continuation of International Application No. PCT/CN2020/111933, filed on Aug. 27, 2020, the disclosure of which is hereby incorporated by reference in its entirety.

TECHNICAL FIELD

This application relates to the field of communication technologies, and in particular, to a communication method and apparatus.

BACKGROUND

In a wireless communication system, a discontinuous reception (DRX) mechanism is introduced, to reduce power consumption of a terminal device while ensuring effective data transmission. The terminal device may listen to a physical downlink control channel (PDCCH) based on the DRX mechanism.

When the DRX mechanism is configured for the terminal device, the terminal device periodically enters a sleep mode at some time. In the sleep mode, the terminal device does not need to listen to the PDCCH. When the terminal device needs to listen to the PDCCH, the terminal device wakes up from the sleep mode, to reduce power consumption of the terminal device. However, when the DRX mechanism is not configured for the terminal device or the terminal device does not perform DRX, the terminal device continuously listens to the PDCCH. As a result, power consumption is high.

Currently, in sidelink (SL) communication, data may be transmitted between a plurality of terminal devices through an SL connection. However, the terminal device may be used as both a data receive end and a data transmit end. When a terminal device used as a data receive end performs SL communication with a plurality of terminal devices used as data transmit ends, or when a plurality of terminal devices perform SL communication with another terminal device and communicate with a base station through a Uu interface, DRX configuration information and SL resource configuration information are not coordinated between the base station, the terminal devices used as the data transmit ends, and the terminal device used as the data receive end. Therefore, power consumption of the terminal device is not effectively reduced.

SUMMARY

This application provides a communication method and apparatus, to reduce power consumption of a communication device.

It should be noted that the communication device mentioned in this application may be a physical communication device, or may be a logical communication device. The logical communication device may be identified by using a source L2/L1 ID, a destination L2/L1 ID, or another UE ID. The communication device includes communication devices such as a first communication device, a second communication device, and a third communication device mentioned in the following, which are not described one by one herein. In addition, it should be noted that a source identifier mentioned in this application is the source L2/L1 ID, and a destination identifier mentioned in this application is the destination L2/L1 ID. Details are not described below again.

According to a first aspect, this application provides a communication method. The method may be performed by a first communication device. The first communication device may be a processor or a chip having a data processing function, and a second communication device may be a processor or a chip having a data processing function. In actual application, the first communication device and the second communication device may be a network device, a terminal, and a roadside unit (RSU). The first communication device and the second communication device are devices that support SL communication, or may be devices that communicate through a Uu interface.

The communication method includes: The first communication device obtains first information, where the first information includes first DRX configuration information and/or first SL resource configuration information from the second communication device; and the first communication device determines second DRX configuration information between the first communication device and the second communication device, where the second DRX configuration information is associated with the first information.

The first communication device determines the second DRX configuration information between the first communication device and the second communication device, and the second DRX configuration information is associated with the first information. This may be understood as determining the second DRX configuration information between the first communication device and the second communication device based on the first information; may be further understood as that the first communication device determines the second DRX configuration information between the first communication device and the second communication device by referring to the first information; or may be understood as that the first information is used to determine the second DRX configuration information. The first information may be understood as reference information or auxiliary information used to determine the second DRX configuration information.

When the first communication device determines the second DRX configuration information, the first communication device refers to the first information sent by the second communication device, so that when the first communication device determines a configuration parameter of the second DRX configuration information, the first communication device may refer to the first information that has been configured by the second communication device. In this way, some parameters of the second DRX configuration information overlap with some parameters of the first information as much as possible, and power usage of the second communication device is considered as much as possible, to reduce power consumption of the second communication device. For example, when the first communication device configures the second DRX configuration information, a period of the configuration parameter may be set based on a period of a configuration parameter of the first DRX configuration information reported by the second communication device. The second DRX configuration information is determined in this manner, to better save energy while meeting a service requirement.

In a possible implementation, the first DRX configuration information includes first SL DRX configuration information and/or Uu DRX configuration information.

It should be noted that, when SL communication is performed between any two communication devices, DRX configuration information configured between the two communication devices is SL DRX configuration information. When any two communication devices communicate with each other through a Uu interface, DRX configuration information configured between the two communication devices is the Uu DRX configuration information. In addition, it should be noted that the first SL DRX configuration information is DRX configuration information configured when the second communication device performs SL communication with a communication device other than the first communication device. The first SL DRX configuration information may be DRX configuration information corresponding to an SL connection, a connection identifier of an SL link, a link identifier, or (source L2/L1 ID, destination L2/L1 ID) between the second communication device and the communication device other than the first communication device. Alternatively, the first SL DRX configuration information may be an SL connection corresponding to an L2/L1 ID of the second communication device and an L2/L1 ID of a communication device other than the L2/L1 ID of the first communication device, or DRX configuration information corresponding to an SL link. The L2/L1 ID may be a source L2/L1 ID, or may be a destination L2/L1 ID. The first Uu DRX configuration information is DRX configuration information configured when the second communication device communicates with a communication device other than the first communication device through a Uu interface.

In this application, the second DRX configuration information may be flexibly determined with reference to a part or all of the first DRX configuration information. This may be understood as that the second DRX configuration information is determined based on a part or all of the first DRX configuration information. This manner can improve flexibility of configuring the second DRX configuration information.

In a possible manner, the first information is associated with the second communication device and a fourth communication device, the fourth communication device may be understood as another communication device other than the second communication device, and there is a connection between the second communication device and the fourth communication device, that is, the second communication device sends the first information (for example, DRX configuration information that has been configured or determined, and/or power level information of the second communication device) to the first communication device, and the first communication device may refer to the second DRX configuration information between the first communication device and the second communication device, where the first information is reference information or auxiliary information. In this implementation, the first communication device determines an optimal second DRX configuration based on the first information, to reduce power consumption.

In a possible implementation, the first DRX configuration information does not include the second DRX configuration information.

It should be noted that the first DRX configuration information does not include the second DRX configuration information. Alternatively, it may be understood as that a parameter type of a configuration parameter of the first DRX configuration information is different from a parameter type of a configuration parameter of the second DRX configuration information. Alternatively, it may be understood as that a parameter value of a configuration parameter of the first DRX configuration information is different from a parameter value of a configuration parameter of the second DRX configuration information. Alternatively, it may also be understood as that both a parameter value and a parameter type of a configuration parameter of the first DRX configuration information are different from those of a configuration parameter of the second DRX configuration information. For example, the first DRX configuration information is SL DRX configuration information A that has been configured when the second communication device performs SL communication with a third communication device, and the first communication device may determine the second DRX configuration information by referring to the first DRX configuration information. A value of a configuration parameter of the second DRX configuration information may be different from values of some configuration parameters of the configuration information A, a type of a configuration parameter of the second DRX configuration information may be different from a type of a configuration parameter of the configuration information A, or both a type and a value of a configuration parameter of the second DRX configuration information may be different from a type and a value of a configuration parameter of the configuration information A.

It should be understood that, the second DRX configuration information is not selected, as the second DRX configuration information, from the first DRX configuration information that has been configured by the second communication device. In this application, the first communication device determines the second DRX configuration information by referring to the first information that has been configured between the second communication device and another communication device other than the first communication device. The first information referred to when the second DRX configuration information is configured in this application does not include the second DRX configuration information, so that the DRX configuration information configured between the first communication device and the second communication device better adapts to requirements of the first communication device and the second communication device, to avoid a case that other configured DRX configuration information is literally transferred.

In a possible implementation, the first communication device sends first indication information to the second communication device, where the first indication information indicates a manner in which the second communication device sends the first information; and the manner includes: actively providing the first information to the first communication device, not actively providing the first information to the first communication device, or stopping providing the first information to the first communication device.

The first communication device may periodically send the first indication information to the second communication device, may send the first indication information within specified time, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, signaling or signals used in different manners may be different or the same. This is not specifically limited herein. For example, the second communication device actively provides the first information by using first signaling, the second communication device does not actively provide the first information by using second signaling, and the second communication device stops actively providing the first information by using third signaling. Alternatively, the second communication device actively provides, does not actively provide, and stops providing the first information by using the first signaling.

In addition, after the second communication device receives the first indication information, the second communication device may immediately report the first information, or may report the first information at specified time or periodically report the first information according to a rule specified by the second communication device. In this application, a manner of reporting the first information may be flexibly controlled by using the first indication information. For example, when SLDrxAssitanceInfo (included in the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device.

The first communication device sends the first indication information to the second communication device, and the second communication device actively provides the first information. Therefore, a transmission delay can be reduced.

In a possible implementation, the first communication device receives second indication information from the second communication device, where the second indication information indicates the first communication device to request the second communication device to provide the first information.

It should be noted that the second communication device sends the second indication information to the first communication device, so that the first communication device may request the second communication device to provide the first information. It may also be understood that the second communication device notifies the first communication device that the second communication device may provide the first information to the first communication device. After the first communication device receives the second indication information, and then the first communication device determines that the first communication device needs to obtain the first information, the first communication device requests the second communication to send the first information.

In a possible implementation, the first communication device performs SL communication with the second communication device, and the first indication information is carried in a PC5 radio resource control (RRC) message, a medium access control (MAC) control element (CE), or sidelink control information (SCI).

It should be noted that SL communication between the first communication device and the second communication device may also be understood as SL transmission between the first communication device and the second communication device. A manner in which the first communication device performs SL communication with the second communication device is not specifically limited herein. However, the "SL communication" may be performed before, after, or at the same time when the SL DRX configuration information is configured between the first communication device and the second communication device.

In addition, when the first communication device performs SL communication with the second communication device, a delay generated when the first indication information is carried in the PC5 RRC message is large, a delay generated when the first indication information is carried in the SCI is small, and a delay generated when the first indication information is carried in the MAC CE is smaller than the delay generated when the first indication information is carried in the PC5 RRC message, and is larger than the delay generated when the first indication information is carried in the SCI. In addition, the PC5 RRC message may be a PC5 RRC reconfiguration message. The first communication device may send the first indication information to the second communication device, so that the second communication device learns how to report the first information.

In a possible implementation, the first communication device communicates with the second communication device through a Uu interface, and the first indication information is carried in a Uu RRC message, a MAC CE, or downlink control information (DCI).

It should be noted that, when the first communication device communicates with the second communication device through the Uu interface, a delay generated when the first indication information is carried in the Uu RRC message is large, a delay generated when the first indication information is carried in the DCI is small, and a delay generated when the first indication information is carried in the MAC CE is smaller than the delay generated when the first indication information is carried in the Uu RRC message, and is larger than the delay generated when the first indication information is carried in the DCI. In addition, the Uu RRC message may be a Uu RRC reconfiguration message. The first communication device may send the first indication information to the second communication device, so that the second communication device learns how to report the first information.

In a possible implementation, the first communication device sends first request information to the second communication device, where the first request information is used to request the second communication device to send the first information to the first communication device.

The first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In a possible implementation, the first request information includes a request reason; and the request reason may include one or more of the following information: configuring the second DRX configuration information, configuring the Uu DRX configuration information, and configuring second SL resource configuration information.

In a possible implementation, the first request information further includes DRX configuration information configured or learned by the first communication device, and the configured or learned DRX configuration information may be indicated by using corresponding identification information. The DRX configuration information configured or learned by the first communication device in the first request information may not include specific DRX configuration information. The identification information may be a source L2/L1 ID, a destination L2/L1 ID, a connection ID, a link ID, a resource pool ID, a configuration authorization ID, a service ID, or the like. This is not specifically limited herein.

The DRX configuration information configured or learned by the first communication device is carried in the first request information sent by the first communication device to the second communication device. This prevents the second communication device from sending, to the first communication device after the second communication device receives the first request information, the DRX configuration information configured or learned by the first communication device. Therefore, an amount of DRX configuration information sent by the second communication device to the first communication device can be reduced, and signaling overheads of the first information can be reduced.

It should be noted that, when the first communication device performs SL communication with the second communication device, a request reason may include that the first communication device needs to configure the second DRX configuration information and the first communication device needs to configure the second SL resource configuration information. The second SL resource configuration information indicates an SL resource configuration used for SL communication between the first communication device and the second communication device. When the first communication device communicates with the second communication device through the Uu interface, the request reason may include that the first communication device needs to configure the second DRX configuration information, the first communication device needs to configure the Uu DRX configuration information, and/or the first communication device needs to configure the second SL resource configuration information. In this way, signaling overheads for sending the first information may be reduced.

In a possible implementation, the first communication device performs SL communication with the second communication device; and the first request information indicates one or more of the following information: The first communication device configures the second DRX configuration information, and the first communication device configures the second SL resource configuration information.

It should be noted that, when the first communication device performs SL communication with the second communication device, the first communication device needs to configure the second DRX configuration information, and/or needs to configure the second SL resource configuration information to send the first request information to the second communication device. This manner can reduce signaling overheads for sending the first information.

In a possible implementation, the first communication device communicates with the second communication device through a Uu interface, and the first request information indicates one or more of the following information: The first communication device configures the Uu DRX configuration information, the first communication device configures the second DRX configuration information, and the first communication device configures second SL resource information.

It should be noted that, when the first communication device communicates with the second communication device through the Uu interface, the first communication device needs to configure the Uu DRX configuration information, the second DRX configuration information, and/or the second SL resource configuration information, to send the first request information to the second communication device. This manner can reduce signaling overheads for sending the first information.

In a possible implementation, it is determined that a preset condition is met, and the first communication device sends the first request information to the second communication device, and the preset condition includes: An access stratum (AS) layer of the first communication device triggers configuration of the second DRX configuration information or the second SL resource configuration information; or an upper layer of the first communication device triggers configuration of the second DRX configuration information or the second SL resource configuration information; and the upper layer includes an application layer and/or a vehicle wireless communication technology (V2X) layer.

In actual application, in addition to the application layer and/or the V2X layer, the upper layer may further include an adaptation layer and a non-access stratum (NAS) layer, and the V2X layer belongs to the NAS layer. Content included in the upper layer in this application is consistent with content included in the upper layer herein. If a concept of the upper layer appears again, details are not described again.

The AS layer of the first communication device triggers configuration of the second DRX configuration information or the second SL resource configuration information, or the upper layer of the first communication device triggers configuration of the second DRX configuration information or the second SL resource configuration information. In this manner, service scheduling is better adapted to a requirement of the first communication device.

In a possible implementation, the first communication device performs SL communication with the second communication device, and the first communication device is a receive end; and the first DRX configuration information includes one or more of the following:

Uu DRX configuration information of the second communication device; and third DRX configuration information of the second communication device used as a receive end, and/or a first identifier; and the first identifier includes a source identifier (ID), a link identifier (ID), a connection identifier (ID), a resource pool identifier, a configuration authorization identifier, or a service identifier corresponding to the third DRX configuration information.

First SL resource configuration information includes:

configuration information of a transmit resource pool of the second communication device, and/or a channel busy rate (CBR) of the transmit resource pool.

In a possible implementation, the first communication device performs SL communication with the second communication device, and the first communication device is a receive end; and the first information includes one or more of the following:

Uu DRX configuration information of the second communication device;

third DRX configuration information of the second communication device used as a receive end, and/or a first identifier; and the first identifier includes a source identifier (ID), a link identifier (ID), a connection identifier (ID), a resource pool identifier, a configuration authorization identifier, or a service identifier corresponding to the third DRX configuration information; and configuration information of a transmit resource pool of the second communication device, and/or a channel busy rate (CBR) of the transmit resource pool.

It should be noted that the transmit resource pool of the second communication device may include one or more types, and each transmit resource pool corresponds to a CBR of the transmit resource pool. If a current CBR of a transmit resource pool of the second communication device is high, a time domain interval of the transmit resource pool may be ignored when the first communication device determines the second DRX configuration information.

The Uu DRX configuration information of the second communication device is Uu DRX configuration information that has been configured between the second communication device and another communication device when the second communication device communicates with the another communication device through a Uu interface. The first communication device configures the second DRX configuration information with reference to the Uu DRX configuration information, so that active time of the Uu DRX configuration information overlaps with active time of the second DRX configuration information as much as possible, to reduce power consumption of the second communication device.

The second communication device is used as a data transmit end of the first communication device. However, for another communication device that may be used as a data receive end, the first communication device may refer to the third DRX configuration information of the second communication device used as a receive end when the first communication device configures the second DRX configuration information. In this way, active time of the third DRX configuration information overlaps with active time of the second DRX configuration information as much as possible. In this way, power loss of the second communication device can be reduced.

When the first communication device configures the second DRX configuration information, the first communication device obtains the foregoing first information, to better save energy while meeting a service requirement.

In a possible implementation, the first communication device performs SL communication with the second communication device, and the first communication device is a transmit end; and the first DRX configuration information includes one or more of the following:

Uu DRX configuration information of the second communication device; and fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.

First SL resource configuration information includes:

configuration information of a receive resource pool of the second communication device, and/or a CBR of the receive resource pool.

In a possible implementation, the first communication device performs SL communication with the second communication device, and the first communication device is a transmit end; and the first information includes one or more of the following:

Uu DRX configuration information of the second communication device; and fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information; and configuration information of a receive resource pool of the second communication device, and/or a CBR of the receive resource pool.

It should be noted that the receive resource pool of the second communication device may include one or more types, and each receive resource pool corresponds to a CBR of the receive resource pool. If a current CBR of a receive resource pool of the second communication device is high, the first communication device may ignore a time domain interval of the receive resource pool when the first communication device determines the second DRX configuration information.

The Uu DRX configuration information of the second communication device is Uu DRX configuration information that has been configured between the second communication device and another communication device through a Uu interface. The first communication device configures the second DRX configuration information with reference to the Uu DRX configuration information, so that active time of the Uu DRX configuration information overlaps with active time of the second DRX configuration information as much as possible. In this way, power consumption of the second communication device can be reduced.

The second communication device is used as a data transmit end of the first communication device. However, for another communication device that may be used as a receive end and a transmit end, when the first communication device configures the second DRX configuration information, the first communication device may refer to the fourth DRX configuration information of the second communication device used as a receive end or a transmit end, so that active time of the fourth DRX configuration information overlaps with active time of the second DRX configuration information as much as possible. In this way, power consumption of the second communication device can be reduced. For example, a period of the fourth DRX configuration information is 16 milliseconds, and active time in each period is 1 to 4 milliseconds. When the first communication device configures the second DRX configuration information is configured, the first communication device may refer to the fourth DRX configuration information, so that the active time of the second DRX configuration information overlaps with the active time of the fourth DRX configuration as much as possible. For example, a period of the second DRX configuration information is also set to 16 milliseconds, and a first to fourth milliseconds in each period are the active time.

If power level information of the second communication device is low, when the second DRX configuration information is configured, a power level status of the second communication device is considered, to reduce power consumption of the second communication device as much as possible. If the power level information of the second communication device is high, a power status of the second communication device may be ignored when the second DRX configuration information is configured.

When the first communication device configures the second DRX configuration information, the first communication device obtains the foregoing first information, to better save energy while meeting a service requirement.

In a possible implementation, the first communication device communicates with the second communication device through a Uu interface; and the first DRX configuration information includes:

fifth DRX configuration information of the second communication device and/or a third identifier; and the third identifier includes a destination identifier (ID), a source identifier, a link identifier, a connection identifier, a source identifier-destination identifier pair, a resource pool identifier, a configuration authorization identifier, or a service identifier corresponding to the fifth DRX configuration information.

The first DRX configuration information includes:

In a possible implementation, the first communication device communicates with the second communication device through a Uu interface; and the first information includes one or more of the following:

fifth DRX configuration information of the second communication device and/or a third identifier; and the third identifier includes a destination identifier (ID), a source identifier, a link identifier, a connection identifier, a source identifier-destination identifier pair, a resource pool identifier, a configuration authorization identifier, or a service identifier corresponding to the fifth DRX configuration information.

The second communication device communicates with the first communication device through a Uu interface, however, the second communication device may perform SL communication with another communication device. Therefore, the second communication device may be used as both a data receive end and a data transmit end. When the first communication device configures the second DRX configuration information, the first communication device may refer to the fifth DRX configuration information of the second communication device used as a receive end and/or a transmit end, so that active time of the fifth DRX configuration information overlaps with active time of the second DRX configuration information as much as possible. In this way, power consumption of the second communication device can be reduced.

When the first communication device configures the second DRX configuration information, the first communication device obtains the foregoing first information, to better save energy while meeting a service requirement.

In a possible implementation, the first information further includes:

power level information of the second communication device.

If the power level information of the second communication device is low, when the second DRX configuration information is configured, a power level status of the second communication device is considered, to reduce power consumption of the second communication device as much as possible. If the power level information of the second communication device is high, a power status of the second communication device may be ignored when the second DRX configuration information is configured.

In a possible implementation, the first communication device obtains the first information in the following cases:

The first information changes; and/or a first timer expires or the first timer does not run.

It should be noted that a change of the first information refers to a parameter update in the first information, for example, a parameter increase, a parameter decrease, or a parameter value change. The parameter increase may be understood as that a quantity of parameters or a type of parameters in the first information increases. The parameter decrease may be understood as that a quantity of parameters or a type of parameters in the first information decreases. The parameter value change may be understood as that a value of a parameter in the first information changes, or may be understood as that a change amplitude of a value of a parameter in the first information exceeds a preset threshold or is lower than a preset threshold.

This avoids a case in which the second communication device frequently reports the first information, and avoids a case in which the second communication device does not report the first information when the first communication device needs the first information.

In a possible implementation, the first timer is started when the first communication device receives the first information from the second communication device.

This avoids a case in which the second communication device frequently reports the first information, and avoids a case in which the second communication device does not report the first information when the first communication device needs the first information.

In a possible implementation, the first communication device performs SL communication with the second communication device; and the AS layer of the first communication device indicates the second DRX configuration information to the upper layer, where the upper layer includes an application layer and/or a V2X layer.

It should be noted that, after the first communication device determines or updates (configures/reconfigures) the second DRX configuration information between the first communication device and the second communication device, the first communication device indicates the second DRX configuration information to the upper layer by using the AS layer. In this way, a memory of the first communication device may be reduced.

In a possible implementation, the AS layer of the first communication device indicates third indication information to the upper layer, where the third indication information includes DRX configuration information between the first communication device and a third communication device.

It should be noted that, after the first communication device determines or updates (configures/reconfigures) the DRX configuration information between the first communication device and the third communication device, the first communication device indicates the third indication information to the upper layer by using the AS layer. Therefore, a memory of the first communication device can be reduced.

In a possible implementation, SL DRX configuration information between the first communication device and the second communication device includes a first configuration and a second configuration; the first configuration includes the second DRX configuration information; the first communication device receives the second configuration from the second communication device; and the first communication device sends the first configuration to the second communication device.

When the first communication device and the second communication device jointly configure the SL DRX configuration information, the first communication device is triggered to configure the first configuration only after the first communication device receives the second configuration configured by the second communication device. In this manner, consistency of the SL DRX configuration information can be ensured, and signaling overheads can be reduced.

In a possible implementation, SL DRX configuration information between the first communication device and the second communication device includes a first configuration and a second configuration; the first configuration includes the second DRX configuration information; the first communication device sends the first configuration to the second communication device; and the first communication device receives the second configuration from the second communication device.

When the first communication device and the second communication device jointly configure the SL DRX configuration information, the second communication device is triggered to configure the second configuration only after the first communication device sends the first configuration to the second communication device. In this manner, consistency of the SL DRX configuration information can be ensured, and signaling overheads can be reduced.

In a possible implementation, the first configuration includes at least one configuration parameter of the SL DRX configuration information; and the second configuration includes at least one configuration parameter of the SL DRX configuration information.

In this manner, the first communication device may configure a configuration parameter of a part of the SL DRX configuration information, and the second communication device may configure a configuration parameter of a part of the SL DRX configuration information. In this manner, signaling overheads of configuring the SL DRX configuration information by the second communication device can be reduced, and device processing consumption can be reduced.

According to a second aspect, an embodiment of this application provides a communication method. The communication method includes: An access stratum AS layer or a vehicle wireless communication technology V2X layer of a first communication device determines second information, and sends (forward) the second information to an upper layer, where the second information includes DRX configuration information between the first communication device and a second communication device.

The first communication device performs SL communication with the second communication device; and the upper layer includes an application layer and/or the V2X layer.

The first communication device indicates the DRX configuration information between the first communication device and the second communication device to the upper layer by using the AS layer or the V2X layer of the first communication device, so that a device memory of the first communication device can be reduced during service scheduling. In addition, it should be noted that the V2X layer in this application belongs to a NAS layer.

According to a third aspect, an embodiment of this application provides a communication method. The communication method includes: A first communication device receives a second configuration from a second communication device; and the first communication device sends a first configuration to the second communication device, where the first communication device performs SL communication with the second communication device, and SL DRX configuration information between the first communication device and the second communication device includes the first configuration and the second configuration.

When the first communication device and the second communication device jointly configure the SL DRX configuration information, the first communication device is triggered to configure the first configuration only after the first communication device receives the second configuration configured by the second communication device. In this manner, consistency of the SL DRX configuration information can be ensured, and signaling overheads can be reduced.

In a possible implementation, the first configuration includes at least one configuration parameter of the SL DRX configuration information; and the second configuration includes at least one configuration parameter of the SL DRX configuration information.

In this manner, the first communication device may configure a configuration parameter of a part of the SL DRX configuration information, and the second communication device may configure a configuration parameter of a part of the SL DRX configuration information. In this manner, signaling overheads of configuring the SL DRX configuration information by the second communication device can be reduced, and device processing consumption can be reduced.

According to a fourth aspect, an embodiment of this application provides a communication method. The communication method includes: A first communication device sends a first configuration to a second communication device; and the first communication device receives a second configuration from the second communication device, where the first communication device performs sidelink SL communication with the second communication device; and SL DRX configuration information between the first communication device and the second communication device includes the first configuration and the second configuration.

When the first communication device and the second communication device jointly configure the SL DRX configuration information, the second communication device is triggered to configure the second configuration only after the first communication device sends the first configuration to the second communication device. In this manner, consistency of the SL DRX configuration information can be ensured, and signaling overheads can be reduced.

In a possible implementation, the first configuration includes at least one configuration parameter of the SL DRX configuration information; and the second configuration includes at least one configuration parameter of the SL DRX configuration information.

In this manner, the first communication device may configure a configuration parameter of a part of the SL DRX configuration information, and the second communication device may configure a configuration parameter of a part of the SL DRX configuration information. In this manner, signaling overheads of configuring the SL DRX configuration information by the second communication device can be reduced, and device processing consumption can be reduced.

It should be noted that the configuration parameter of the SL DRX configuration information includes a plurality of types, such as a period, active duration (onduration), a start offset (startoffset), and a retransmission-related timer (such as drx-RetransmissionTimerSL and drx-HARQ-RTT-TimerSL) and the like. The configuration parameter is not enumerated herein.

For example, the first configuration includes at least one configuration parameter of the SL DRX configuration information, and the second configuration includes at least one configuration parameter of the SL DRX configuration information. For example, there are 10 configuration parameters of the SL DRX configuration information, where three configuration parameters are fixed parameter configurations, the first configuration includes five configuration parameters, and the second configuration may include two configuration parameters. Alternatively, the first configuration includes five configuration parameters, and the second configuration includes two configuration parameters. It is assumed that the period is a fixed configuration, that is, a period of DRX configuration information configured between the first communication device and any communication device is the same. Therefore, a period does not need to be configured for the first communication device and the second communication device. In actual application, the configuration parameter of the SL DRX configuration information may not include a fixed configuration, and a parameter type and a parameter value included in the SL DRX configuration information are not specifically limited in this application.

According to a fifth aspect, an embodiment of this application provides a communication method. The communication method includes: A first communication device determines first indication information, where the first indication information indicates a manner in which a second communication device sends first information; the manner includes: actively providing the first information to the first communication device, not actively providing the first information to the first communication device, or stopping providing the first information to the first communication device; the first information is used to determine second SL DRX configuration information between the first communication device and the second communication device; and the first communication device sends the first indication information to the second communication device.

In this embodiment of this application, that the second communication device does not actively provide the first information to the first communication device may be understood as that the second communication device may independently determine an occasion for sending the first information to the first communication device. In another case, in this embodiment of this application, that the second communication device does not actively provide the first information to the first communication device may be understood as that the second communication device sends the first information to the first communication device only after the second communication device receives a request of the first communication device.

The first communication device may periodically send the first indication information to the second communication device, may send the first indication information within specified time, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, signaling or signals used in different manners may be different or the same. This is not specifically limited herein. For example, the second communication device actively provides the first information by using first signaling, the second communication device does not actively provide the first information by using second signaling, and the second communication device stops actively providing the first information by using third signaling. Alternatively, the second communication device actively provides, does not actively provide, and stops providing the first information by using the first signaling.

In addition, after the second communication device receives the first indication information, the second communication device may immediately report the first information, or may report the first information at specified time or periodically report the first information according to a rule specified by the second communication device. In this application, a manner of reporting the first information may be flexibly controlled by using the first indication information. For example, when SLDrxAssitanceInfo (included in the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device.

In a possible implementation, the method further includes: receiving the first information from the second communication device.

In a possible implementation, the method further includes: determining the second SL DRX configuration information between the first communication device and the second communication device based on the first information, and the second SL DRX configuration information is associated with the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

It should be noted that the first information may be information associated between the second communication device and another communication device other than the first communication device. When SL communication is performed between any two communication devices, DRX configuration information configured between the two communication devices is SL DRX configuration information. When any two communication devices communicate with each other through a Uu interface, DRX configuration information configured between the two communication devices is Uu DRX configuration information. In addition, it should be noted that first SL DRX configuration information is DRX configuration information configured when the second communication device performs SL communication with a communication device other than the first communication device. The first SL DRX configuration information may be DRX configuration information corresponding to an SL connection, a connection identifier of an SL link, a link identifier, or (source L2/L1 ID, destination L2/L1 ID) between the second communication device and the communication device other than the first communication device. Alternatively, the first SL DRX configuration information may be an SL connection corresponding to an L2/L1 ID of the second communication device and an L2/L1 ID of a communication device other than the L2/L1 ID of the first communication device, or DRX configuration information corresponding to an SL link. The L2/L1 ID may be a source L2/L1 ID, or may be a destination L2/L1 ID. The first Uu DRX configuration information is DRX configuration information configured when the second communication device communicates with a communication device other than the first communication device through a Uu interface.

In a possible implementation, the first indication information is carried in a radio resource control RRC message, a media access control MAC control element CE, or side link control information SCI.

It should be noted that SL communication between the first communication device and the second communication device may also be understood as SL transmission between the first communication device and the second communication device. A manner in which the first communication device performs SL communication with the second communication device is not specifically limited herein. However, the "SL communication" may be performed before, after, or at the same time when the SL DRX configuration information is configured between the first communication device and the second communication device.

In addition, when the first communication device performs SL communication with the second communication device, a delay generated when the first indication information is carried in the PC5 RRC message is large, a delay generated when the first indication information is carried in the SCI is small, and a delay generated when the first indication information is carried in the MAC CE is smaller than the delay generated when the first indication information is carried in the PC5 RRC message, and is larger than the delay generated when the first indication information is carried in the SCI. In addition, the PC5 RRC message may be a PC5 RRC reconfiguration message. The first communication device may send the first indication information to the second communication device, so that the second communication device learns how to report the first information.

According to a sixth aspect, an embodiment of this application further provides a communication method, including:

A first communication device determines first indication information, where the first indication information indicates a manner in which the second communication device sends first information; the manner includes: not actively providing the first information to the first communication device; the first information is used to determine second Uu DRX configuration information between the first communication device and the second communication device; and the first communication device sends the first indication information to the second communication device.

It should be noted that the second communication device may be understood as a base station, and the first communication device may be understood as UE. In other words, the UE needs to send the first information to the base station after the UE receives request information of the base station or when the UE receives request information of the base station.

In a possible implementation, the method further includes: receiving the first information from the second communication device.

In a possible implementation, the method further includes: determining the second Uu DRX configuration information between the first communication device and the second communication device based on the first information; and the second Uu DRX configuration information is associated with the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a Uu RRC message, a media access control MAC control element CE, or DCI.

It should be noted that the first information in the fifth aspect and the implementations of the fifth aspect, or the sixth aspect and the implementations of the sixth aspect is not limited to the first information included in the first aspect, and may also be applicable to a case in which the first information includes other information.

According to a seventh aspect, an embodiment of this application provides a communication method. The communication method includes: A first communication device determines first request information, where the first request information is used to request a second communication device to send first information to the first communication device; the first information is used to determine second DRX configuration information between the first communication device and the second communication device; and the first communication device sends the first request information to the second communication device.

The first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In a possible implementation, the method further includes: receiving second indication information from the second communication device, where the second indication information indicates the first communication device to request the second communication device to provide the first information.

In a possible implementation, the first request information includes a request reason; and the request reason includes one or more of the following information: configuring the second DRX configuration information and configuring second SL resource configuration information; or the first request information indicates one or more of the following information: configuring the second DRX configuration information and configuring second SL resource configuration information.

In a possible implementation, it is determined that a preset condition is met, and the first communication device sends the first request information to the second communication device, where the preset condition includes:

An access stratum AS layer of the first communication device triggers configuration of the second SL DRX configuration information or the second SL resource configuration information; or an upper layer of the first communication device triggers configuration of the second SL DRX configuration information or the second SL resource configuration information, where the upper layer includes an application layer and/or a vehicle wireless communication technology V2X layer.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the method further includes: receiving the first information from the second communication device.

In a possible implementation, the method further includes: determining the second SL DRX configuration information between the first communication device and the second communication device based on the first information, and the second SL DRX configuration information is associated with the first information.

It should be noted that the first information in the seventh aspect and the implementation of the seventh aspect is not limited to the first information included in the first aspect, and may also be applicable to a case in which the first information includes other information.

According to an eighth aspect, an embodiment of this application provides a communication method. The method may be performed by a second communication device. A first communication device may be a processor or a chip having a data processing function, and the second communication device may be a processor or a chip having a data processing function. In actual application, the first communication device and the second communication device may be a network device, a terminal, and an RSU. The first communication device and the second communication device are devices that support SL communication, or may be devices that communicate through a Uu interface.

The communication method includes: The second communication device determines first information; the first information includes first DRX configuration information and/or first sidelink SL resource configuration information; the first information is associated with the second communication device; the second communication device sends the first information to the first communication device, so that the first communication device determines second DRX configuration information based on the first information; and
    the second communication device sends the first information to the first communication device.

After the second communication device determines the first information, the second communication device sends the first information to the first communication device, so that the first communication device may determine the second DRX configuration information between the first communication device and the second communication device by referring to the first information. This may also be understood as that the first information is used to determine the second DRX configuration information. When the first communication device determines the second DRX configuration information, the first communication device refers to the first information sent by the second communication device. In this way, some parameters of the second DRX configuration information overlap with some parameters of the first information as much as possible, and power usage of the second communication device is considered as much as possible, to better save energy while meeting a service requirement of the second DRX configuration information.

In a possible implementation, the second communication device receives the second DRX configuration information from the first communication device; the second DRX configuration information is DRX configuration information between the first communication device and the second communication device; and the second DRX configuration information is associated with the first information.

It should be noted that, after the second communication device determines the first information, the second communication device sends the first information to the first communication device, so that the first communication device determines the second DRX configuration information between the first communication device and the second communication device based on the first information. This may be understood as that the first communication device determines the second DRX configuration information between the first communication device and the second communication device by referring to the first information, or the first information is used to determine the second DRX configuration information. For example, when the first communication device determines the second DRX configuration information, the first communication device refers to the first information sent by the second communication device, so that when the first communication device determines a configuration parameter of the second DRX configuration information, the first communication device may refer to the first information that has been configured by the second communication device. In this way, some parameters of the second DRX configuration information overlap with some parameters of the first information as much as possible, and power usage of the second communication device is considered as much as possible, to reduce power consumption of the second communication device.

In a possible implementation, the first DRX configuration information includes first SL DRX configuration information and/or Uu DRX configuration information.

In this application, when the second DRX configuration information is determined, one or more types of the first DRX configuration information may be flexibly selected. This manner can improve flexibility of configuring the second DRX configuration information.

In a possible implementation, the first DRX configuration information does not include the second DRX configuration information.

It should be understood that, the second DRX configuration information is not selected, as the second DRX configuration information, from DRX configuration information configured by the second communication device. In this application, the first communication device determines the second DRX configuration information by referring to the first information configured between the second communication device and the first communication device. The first information referred to when the second DRX configuration information is configured in this application does not include the second DRX configuration information, so that the DRX configuration information configured between the first communication device and the second communication device better adapts to requirements of the first communication device and the second communication device, to avoid a case that other configured DRX configuration information is literally transferred.

In a possible implementation, the second communication device receives first indication information from the second communication device, where the first indication information indicates a manner in which the second communication device sends the first information; and the manner includes: actively providing the first information to the first communication device, not actively providing the first information to the first communication device, or stopping providing the first information to the first communication device.

It should be noted that signaling or signals used in different manners may be different or the same, which is not specifically limited herein. For example, the second communication device actively provides the first information by using first signaling, the second communication device does not actively provide the first information by using second signaling, and the second communication device stops providing the first information by using third signaling. Alternatively, the second communication device actively provides, does not actively provide, and stops providing the first information by using the first signaling.

In addition, the first communication device may periodically send the first indication information to the second communication device, may send the first indication information within specified time, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, after the second communication device receives the first indication information, the second communication device may immediately report the first information, or may report the first information at specified time or periodically report the first information according to a rule specified by the second communication device. In this application, a manner of reporting the first information may be flexibly controlled by using the first indication information. For example, when SLDrxAssitanceInfo (that is, the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device. The first communication device sends the first indication information to the second communication device, and the second communication device actively provides the first information. Therefore, a transmission delay can be reduced.

In a possible implementation, the second communication device sends second indication information to the first communication device, where the second indication information indicates the first communication device to request the second communication device to provide the first information.

It should be noted that the second communication device sends the second indication information to the first communication device, so that the first communication device may request the second communication device to provide the first information. It may also be understood that the second communication device notifies the first communication device that the second communication device may provide the first information to the first communication device. After the first communication device receives the second indication information, and then the first communication device determines that the first communication device needs to obtain the first information, the first communication device requests the second communication to send the first information.

In a possible implementation, the first communication device performs SL communication with the second communication device, and the second indication information is carried in a PC5 RRC message, a MAC CE, or SCI.

It should be noted that SL communication between the first communication device and the second communication device may also be understood as SL transmission between the first communication device and the second communication device, or may be understood as an SL connection between the first communication device and the second communication device. A manner in which the first communication device performs SL communication with the second communication device is not specifically limited herein. However, "SL communication" may be performed before, after, or at the same time when the SL DRX configuration information is configured between the first communication device and the second communication device.

In addition, when the first communication device performs SL communication with the second communication device, a delay generated when the second indication information is carried in the PC5 RRC message is large, a delay generated when the second indication information is carried in the SCI is small, and a delay generated when the second indication information is carried in the MAC CE is larger than the delay generated when the second indication information is carried in the SCI, and is smaller than the delay generated when the second indication information is carried in the PC5 RRC message. In addition, the PC5 RRC message may be a PC5 RRC reconfiguration message. The second communication device may send the second indication information to the first communication device, so that the first communication device learns that the first communication device may request the first information from the second communication device.

In a possible implementation, the first communication device communicates with the second communication device through a Uu interface, and the first indication information is carried in a Uu RRC message, a MAC CE, or DCI.

It should be noted that, when the first communication device communicates with the second communication device through the Uu interface, a delay generated when the second indication information is carried in the Uu RRC message is large, a delay generated when the second indication information is carried in the DCI is small, and a delay generated when the second indication information is carried in the MAC CE is smaller than the delay generated when the second indication information is carried in the Uu RRC message, and is larger than the delay generated when the second indication information is carried in the DCI. In addition, the Uu RRC message may be a Uu RRC reconfiguration message. The second communication device may send the second indication information to the first communication device, so that the first communication device learns that the first communication device may request the first information from the second communication device.

In a possible implementation, the second communication device receives first request information from the first communication device, where the first request information is used to request the second communication device to send the first information to the first communication device.

The first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In a possible implementation, the first request information includes a request reason; and the request reason may include one or more of the following information: configuring the second DRX configuration information, configuring the Uu DRX configuration information, and configuring second SL resource configuration information.

It should be noted that, when the first communication device performs SL communication with the second communication device, a request reason may include that the first communication device needs to configure the second DRX configuration information, and/or the first communication device needs to configure the second SL resource configuration information. When the first communication device communicates with the second communication device through the Uu interface, the request reason may include that the first communication device needs to configure the second DRX configuration information, the first communication device needs to configure the Uu DRX configuration information, and/or the first communication device needs to configure the second SL resource configuration information. In this way, signaling overheads for sending the first information may be reduced.

In a possible implementation, the first communication device performs SL communication with the second communication device; and the first indication information indicates one or more of the following information: configuring the second DRX configuration information and configuring second SL resource configuration information.

It should be noted that, when the first communication device performs SL communication with the second communication device, the first communication device needs to configure the second DRX configuration information, and/or needs to configure the second SL resource configuration information to send the first request information to the second communication device. This manner can reduce signaling overheads for sending the first information.

In a possible implementation, the first communication device communicates with the second communication device through a Uu interface, and the first indication information indicates one or more of the following information: configuring the Uu DRX configuration information, configuring the second DRX configuration information, and configuring the second SL resource information.

It should be noted that, when the first communication device communicates with the second communication device through the Uu interface, the first communication device needs to configure the Uu DRX configuration information, the second DRX configuration information, and/or the second SL resource configuration information, to send the first request information to the second communication device. This manner can reduce signaling overheads for sending the first information.

In a possible implementation, the second communication device performs SL communication with the first communication device, and the second communication device is a transmit end; and the first DRX configuration information includes one or more of the following:
Uu DRX configuration information of the second communication device; and
third DRX configuration information of the second communication device used as a receive end, and/or a first identifier; and the first identifier includes a source identifier, a link identifier, a connection identifier, a resource pool identifier, a configuration authorization identifier, or a service identifier corresponding to the third DRX configuration information.
First SL resource configuration information includes:
configuration information of a transmit resource pool of the second communication device, and/or a channel busy rate CBR of the transmit resource pool.

It should be noted that the transmit resource pool of the second communication device may include one or more types, and each transmit resource pool corresponds to a CBR of the transmit resource pool. If a current CBR of a transmit resource pool of the second communication device is high, a time domain interval of the transmit resource pool may be ignored when the first communication device determines the second DRX configuration information.

The Uu DRX configuration information of the second communication device is Uu DRX configuration information that has been configured between the second communication device and another communication device through a Uu interface. The first communication device configures the second DRX configuration information with reference to the Uu DRX configuration information, so that active time of the Uu DRX configuration information overlaps with active time of the second DRX configuration information as much as possible. In this way, power consumption of the second communication device can be reduced.

The second communication device is used as a data transmit end of the first communication device. However, for another communication device that may be used as a data receive end, when the first communication device configures the second DRX configuration information, the first communication device may refer to the third DRX configuration information of the second communication device used as a receive end. In this way, active time of the third DRX configuration information overlaps with active time of the second DRX configuration information as much as possible. Therefore, power consumption of the second communication device can be reduced.

When the first communication device configures the second DRX configuration information, the first communication device obtains the foregoing first information, to better save energy while meeting a service requirement.

In a possible implementation, the second communication device performs SL communication with the first communication device, and the second communication device is a receive end; and the first DRX configuration information includes one or more of the following:
Uu DRX configuration information of the second communication device; and
fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.
First SL resource configuration information includes:
configuration information of a receive resource pool of the second communication device, and/or a CBR of the receive resource pool.

It should be noted that the receive resource pool of the second communication device may include one or more types, and each receive resource pool corresponds to a CBR of the receive resource pool. If a current CBR of a receive resource pool of the second communication device is high, a time domain interval of the receive resource pool may be ignored when the first communication device determines the second DRX configuration information.

The Uu DRX configuration information of the second communication device is Uu DRX configuration information that has been configured between the second communication device and another communication device through a Uu interface. The first communication device configures the second DRX configuration information with reference to the Uu DRX configuration information, so that active time of the Uu DRX configuration information overlaps with active time of the second DRX configuration information as much as possible. In this way, power consumption of the second communication device can be reduced.

The second communication device is used as a data transmit end of the first communication device. However, for another communication device that may be used as a data receive end and a transmit end, when the first communication device configures the second DRX configuration information, the first communication device may refer to the fourth DRX configuration information of the second communication device used as a receive end, so that active time of the fourth DRX configuration information overlaps with active time of the second DRX configuration information as much as possible. In this way, power consumption of the second communication device can be reduced.

When the first communication device configures the second DRX configuration information, the first communication device obtains the foregoing first information, to better save energy while meeting a service requirement.

In a possible implementation, the second communication device communicates with the first communication device through a Uu interface; and the first DRX configuration information includes one or more of the following:

fifth DRX configuration information of the second communication device and/or a third identifier; and the third identifier includes a destination identifier, a source identifier, a link identifier, a connection identifier, a source identifier-destination identifier pair, a resource pool identifier, a configuration authorization identifier, or a service identifier corresponding to the fifth DRX configuration information.

In a possible implementation, the first information further includes:

power level information of the second communication device.

If the power level information of the second communication device is low, when the second DRX configuration information is configured, a power level status of the second communication device is considered, to reduce power consumption of the second communication device as much as possible. If the power level information of the second communication device is high, a power status of the second communication device may be ignored when the second DRX configuration information is configured.

The second communication device communicates with the first communication device through a Uu interface. However, the second communication device may perform SL communication with another communication device. Therefore, the second communication device may be used as both a data receive end and a data transmit end. When the first communication device configures the second DRX configuration information, the first communication device may refer to the fifth DRX configuration information of the second communication device used as a receive end and/or a transmit end, so that active time of the fifth DRX configuration information overlaps with active time of the second DRX configuration information as much as possible. In this way, power consumption of the second communication device can be reduced.

If the power level information of the second communication device is low, when the second DRX configuration information is configured, a power level status of the second communication device is considered, to reduce power consumption of the second communication device as much as possible. If the power level information of the second communication device is high, a power status of the second communication device may be ignored when the second DRX configuration information is configured.

When the first communication device configures the second DRX configuration information, the first communication device obtains the foregoing first information, to better save energy while meeting a service requirement.

In a possible implementation, the second communication device sends the first information in the following cases:

The first information changes; and/or a first timer expires or the first timer does not run.

This avoids a case in which the second communication device frequently reports the first information, and avoids a case in which the second communication device does not report the first information when the first communication device needs the first information.

In a possible implementation, the second communication device starts the first timer when the second communication device sends the first information to the first communication device or after the second communication device sends the first information to the first communication device.

This avoids a case in which the second communication device frequently reports the first information, and avoids a case in which the second communication device does not report the first information when the first communication device needs the first information.

In a possible implementation, the second communication device performs SL communication with the first communication device; and the method further includes:

An AS layer of the second communication device indicates the second DRX configuration information to an upper layer, where the upper layer includes an application layer and/or a V2X layer.

It should be noted that, after the second communication device determines or updates (configures/reconfigures) the second DRX configuration information between the first communication device and the second communication device, the second communication device indicates the second DRX configuration information to the upper layer by using the AS layer. Therefore, a memory of the second communication device can be reduced.

In a possible implementation, an AS layer of the second communication device indicates third indication information to an upper layer, where the third indication information includes DRX configuration information between the second communication device and a third communication device.

It should be noted that, after the second communication device determines or updates (configures/reconfigures) the DRX configuration information between the second communication device and the third communication device, the second communication device indicates the third indication information to the upper layer by using the AS layer. Therefore, a memory of the second communication device can be reduced.

In a possible implementation, SL DRX configuration information between the second communication device and the first communication device includes a first configuration and a second configuration; the first configuration includes the second DRX configuration information; the second communication device sends the second configuration to the first communication device; and the second communication device receives the first configuration from the first communication device.

When the first communication device and the second communication device jointly configure the SL DRX configuration information, the first communication device is triggered to configure the first configuration only after the second communication device sends the second configuration to the first communication device. In this manner, consistency of the SL DRX configuration information can be ensured, and signaling overheads can be reduced.

In a possible implementation, SL DRX configuration information between the second communication device and the first communication device includes a first configuration and a second configuration; the first configuration includes the second DRX configuration information; the second communication device receives the first configuration from the first communication device; and the second communication device sends the second configuration to the first communication device.

When the first communication device and the second communication device jointly configure the SL DRX configuration information, the second communication device is triggered to configure the second configuration only after the second communication device receives the first configuration configured by the first communication device. In this manner, consistency of the SL DRX configuration information can be ensured, and signaling overheads can be reduced.

In a possible implementation, the first configuration includes at least one configuration parameter of the SL DRX configuration information; and the second configuration includes at least one configuration parameter of the SL DRX configuration information.

In this manner, the first communication device may configure a configuration parameter of a part of the SL DRX configuration information, and the second communication device may configure a configuration parameter of a part of the SL DRX configuration information. In this manner, signaling overheads of configuring the SL DRX configuration information by the second communication device can be reduced, and device processing consumption can be reduced.

According to a ninth aspect, an embodiment of this application provides a communication method, including: A second communication device sends first information when the second communication device determines that the following cases are met:

The first information changes; and/or a first timer expires or the first timer does not run; and the first information is used to determine first SL DRX configuration information between a first communication device and the second communication device.

In a possible implementation, the first timer is started when the first information is sent to the first communication device or after the first information is sent to the first communication device.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

It should be noted that a change of the first information refers to a parameter update in the first information, for example, a parameter increase, a parameter decrease, or a parameter value change. The parameter increase may be understood as that a quantity of parameters or a type of parameters in the first information increases. The parameter decrease may be understood as that a quantity of parameters or a type of parameters in the first information decreases. The parameter value change may be understood as that a value of a parameter in the first information changes, or may be understood as that a change amplitude of a value of a parameter in the first information exceeds a preset threshold or is lower than a preset threshold.

This avoids a case in which the second communication device frequently reports the first information, and avoids a case in which the second communication device does not report the first information when the first communication device needs the first information.

It should be noted that the first information in the sixth aspect and the implementation of the sixth aspect is not limited to the first information included in the first aspect, and may also be applicable to a case in which the first information includes other information.

According to a tenth aspect, an embodiment of this application provides a communication method. The communication method includes: A second communication device receives first indication information from a first communication device, where the first indication information indicates a manner in which a second communication device sends first information; the manner includes: actively providing the first information to the first communication device, not actively providing the first information to the first communication device, or stopping providing the first information to the first communication device; the first information is used to determine second SL DRX configuration information between the first communication device and the second communication device; and the second communication device determines the first information.

The first communication device may periodically send the first indication information to the second communication device, may send the first indication information within specified time, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, signaling or signals used in different manners may be different or the same. This is not specifically limited herein. For example, the second communication device actively provides the first information by using first signaling, the second communication device does not actively provide the first information by using second signaling, and the second communication device stops actively providing the first information by using third signaling. Alternatively, the second communication device actively provides, does not actively provide, and stops providing the first information by using the first signaling.

In addition, after the second communication device receives the first indication information, the second communication device may immediately report or send the first information, or may report the first information at specified time or periodically report or send the first information according to a rule specified by the second communication device. In this application, a manner of reporting the first information may be flexibly controlled by using the first indication information. For example, when SLDrxAssitanceInfo (included in the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device.

It is easy to understand that reporting in this embodiment of this application may also be understood as sending.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

It should be noted that the first information may be information associated between the second communication device and another communication device other than the first communication device. When SL communication is performed between any two communication devices, DRX configuration information configured between the two communication devices is SL DRX configuration information. When any two communication devices communicate with each other through a Uu interface, DRX configuration information configured between the two communication devices is Uu DRX configuration information. In addition, it should be noted that first SL DRX configuration information is DRX configuration information configured when the second communication device performs SL communication with a communication device other than the first communication device. The first SL DRX configuration information may be DRX configuration information corresponding to an SL connection, a connection identifier of an SL link, a link identifier, or (source L2/L1 ID, destination L2/L1 ID) between the second communication device and the communication device other than the first communication device. Alternatively, the first SL DRX configuration information may be an SL connection corresponding to an L2/L1 ID of the second communication device and an L2/L1 ID of a communication device other than the L2/L1 ID of the first communication device, or DRX configuration information corresponding to an SL link. The L2/L1 ID may be a source L2/L1 ID, or may be a destination L2/L1 ID. The first Uu DRX configuration information is DRX configuration information configured when the second communication device communicates with a communication device other than the first communication device through a Uu interface.

In a possible implementation, the first indication information is carried in a radio resource control RRC message, a media access control MAC control element CE, or side link control information SCI.

It should be noted that SL communication between the first communication device and the second communication device may also be understood as SL transmission between the first communication device and the second communication device. A manner in which the first communication device performs SL communication with the second communication device is not specifically limited herein. However, the "SL communication" may be performed before, after, or at the same time when the SL DRX configuration information is configured between the first communication device and the second communication device.

In addition, when the first communication device performs SL communication with the second communication device, a delay generated when the first indication information is carried in the PC5 RRC message is large, a delay generated when the first indication information is carried in the SCI is small, and a delay generated when the first indication information is carried in the MAC CE is smaller than the delay generated when the first indication information is carried in the PC5 RRC message, and is larger than the delay generated when the first indication information is carried in the SCI. In addition, the PC5 RRC message may be a PC5 RRC reconfiguration message. The first communication device may send the first indication information to the second communication device, so that the second communication device learns how to report the first information.

According to an eleventh aspect, an embodiment of this application further provides a communication method, including: A second communication device receives first indication information from a first communication device, where the first indication information indicates a manner in which the second communication device sends first information; the manner includes: not actively providing the first information to the first communication device; the first information is used to determine second SL DRX configuration information between the first communication device and the second communication device; and the second communication device determines the first information.

It should be noted that the second communication device may be understood as a base station, and the first communication device may be understood as UE. In other words, the UE needs to send the first information to the base station after the UE receives request information of the base station or when the UE receives request information of the base station.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a Uu RRC message, a media access control MAC control element CE, or DCI.

It should be noted that the first information in the tenth aspect and the implementations of the tenth aspect, or in the eleventh aspect and the implementations of the eleventh aspect is not limited to the first information included in the first aspect, and may also be applicable to a case in which the first information includes other information.

According to a twelfth aspect, an embodiment of this application provides a communication method. The communication method includes: A second communication device receives first request information from a first communication device, where the first request information is used to request the second communication device to send first information to the first communication device; the first information is used to determine second SL DRX configuration information between the first communication device and the second communication device; and the second communication device determines the first information.

The first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In a possible implementation, the method further includes sending second indication information, where the second indication information indicates the first communication device to request the second communication device to provide the first information.

In a possible implementation, the first request information includes a request reason; and the request reason includes one or more of the following information: configuring the second SL DRX configuration information and configuring second SL resource configuration information; or the first request information indicates one or more of the following information: configuring the second SL DRX configuration information and configuring second SL resource configuration information.

In a possible implementation, it is determined that a preset condition is met, and the first communication device sends the first request information to the second communication device, where the preset condition includes:
An access stratum AS layer of the first communication device triggers configuration of the second SL DRX configuration information or the second SL resource configuration information; or
an upper layer of the first communication device triggers configuration of the second SL DRX configuration information or the second SL resource configuration information, where the upper layer includes an application layer and/or a vehicle wireless communication technology V2X layer.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the second communication device sends the first information to the first communication device.

It should be noted that the first information in the twelfth aspect and the implementation of the twelfth aspect is not limited to the first information included in the first aspect, and may also be applicable to a case in which the first information includes other information.

According to a thirteenth aspect, an embodiment of this application provides a communication apparatus, including a transceiver unit, configured to obtain first information, where the first information includes first DRX configuration information and/or first SL resource configuration information from a second communication device; and a processing unit, configured to determine second DRX configuration information between the communication apparatus and the second communication device; and the second DRX configuration information is associated with the first information.

In a possible implementation, the first DRX configuration information includes first SL DRX configuration information and/or Uu DRX configuration information.

In a possible implementation, the first DRX configuration information does not include the second DRX configuration information.

In a possible implementation, the processing unit is further configured to:
send first indication information to the second communication device, where the first indication information indicates a manner in which the second communication device sends the first information; and the manner includes: actively providing the first information to the first communication device, not actively providing the first information to the first communication device, or stopping providing the first information to the first communication device.

In a possible implementation, the processing unit is further configured to receive second indication information from the second communication device, where the second indication information indicates the first communication device to request the second communication device to provide the first information.

In a possible implementation, the first communication device performs SL communication with the second communication device, and the first indication information is carried in a PC5 RRC message, a MAC CE, or SCI.

In a possible implementation, the first communication device communicates with the second communication device through a Uu interface, and the first indication information is carried in a Uu RRC message, a MAC CE, or DCI.

In a possible implementation, the processing unit is further configured to:
send first request information to the second communication device, where the first request information is used to request the second communication device to send the first information to the first communication device.

In a possible implementation, the first request information includes a request reason; and the request reason may include one or more of the following information: configuring the second DRX configuration information, configuring the Uu DRX configuration information, and configuring second SL resource configuration information.

In a possible implementation, the first communication device performs SL communication with the second communication device; and the first request information indicates one or more of the following information: configuring the second DRX configuration information and configuring the second SL resource configuration information.

In a possible implementation, the first communication device communicates with the second communication device through a Uu interface, and the first request information indicates one or more of the following information: configuring the Uu DRX configuration information, configuring the second DRX configuration information, and configuring the second SL resource information.

In a possible implementation, it is determined that a preset condition is met, and the first communication device sends the first request information to the second communication device, where the preset condition includes:
An access stratum AS layer of the first communication device triggers configuration of the second DRX configuration information or the second SL resource configuration information; or
an upper layer of the first communication device triggers configuration of the second DRX configuration information or the second SL resource configuration information, where the upper layer includes an application layer and/or a V2X layer.

In a possible implementation, the first communication device performs SL communication with the second communication device, and the first communication device is a receive end; and the first DRX configuration information includes one or more of the following:
Uu DRX configuration information of the second communication device; and
third DRX configuration information of the second communication device used as a receive end, and/or a first identifier; and the first identifier includes a source identifier (ID), a link identifier (ID), a connection identifier (ID), a resource pool identifier, a configuration authorization identifier, or a service identifier corresponding to the third DRX configuration information.

First SL resource configuration information includes:
configuration information of a transmit resource pool of the second communication device, and/or a channel busy rate (CBR) of the transmit resource pool.

In a possible implementation, the first communication device performs SL communication with the second communication device, and the first communication device is a transmit end; and the first DRX configuration information includes one or more of the following:

Uu DRX configuration information of the second communication device; and fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.

First SL resource configuration information includes:

configuration information of a receive resource pool of the second communication device, and/or a CBR of the receive resource pool.

In a possible implementation, the first communication device communicates with the second communication device through a Uu interface; and the first DRX configuration information includes:

fifth DRX configuration information of the second communication device and/or a third identifier; and the third identifier includes a destination identifier (ID), a source identifier, a link identifier, a connection identifier, a source identifier-destination identifier pair, a resource pool identifier, a configuration authorization identifier, or a service identifier corresponding to the fifth DRX configuration information.

In a possible implementation, the first information further includes:

power level information of the second communication device.

In a possible implementation, the processing unit obtains the first information in the following cases:

the first information changes; and/or a first timer expires or the first timer does not run.

In a possible implementation, the processing unit is further configured to start the first timer after the processing unit sends the first information.

In a possible implementation, the first communication device performs SL communication with the second communication device; and the processing unit is further configured to:

indicate the second DRX configuration information to the upper layer by using the AS layer, where the upper layer includes the application layer and/or the V2X layer.

In a possible implementation, the processing unit is further configured to:

indicate third indication information to the upper layer by using the AS layer, where the third indication information includes DRX configuration information between the first communication device and a third communication device.

In a possible implementation, SL DRX configuration information between the first communication device and the second communication device includes a first configuration and a second configuration; the first configuration includes the second DRX configuration information; and the processing unit is further configured to:

receive the second configuration from the second communication device; and send the first configuration to the second communication device.

In a possible implementation, SL DRX configuration information between the first communication device and the second communication device includes a first configuration and a second configuration; the first configuration includes the second DRX configuration information; and the processing unit is further configured to:

send the first configuration to the second communication device; and receive the second configuration from the second communication device.

In a possible implementation, the first configuration includes at least one configuration parameter of the SL DRX configuration information; and the second configuration includes at least one configuration parameter of the SL DRX configuration information.

According to a fourteenth aspect, an embodiment of this application provides a communication apparatus, including a processing unit, configured to: determine second information by using an AS layer or a vehicle wireless communication technology V2X layer of a first communication device; and send second information to an upper layer, where the second information includes DRX configuration information between the first communication device and a second communication device.

The first communication device performs sidelink SL communication with the second communication device; and the upper layer includes an application layer and/or the V2X layer.

According to a fifteenth aspect, an embodiment of this application provides a communication apparatus, including a transceiver unit, configured to: receive a second configuration from a second communication device; and send a first configuration to the second communication device, where a first communication device performs sidelink SL communication with the second communication device, and SL DRX configuration information between the first communication device and the second communication device includes the first configuration and the second configuration.

In a possible implementation, the first configuration includes at least one configuration parameter of the SL DRX configuration information; and the second configuration includes at least one configuration parameter of the SL DRX configuration information.

According to a sixteenth aspect, an embodiment of this application provides a communication apparatus, including a transceiver unit, configured to: send a first configuration to a second communication device; and receive a second configuration from the second communication device, where a first communication device performs sidelink SL communication with the second communication device, and SL DRX configuration information between the first communication device and the second communication device includes the first configuration and the second configuration.

In a possible implementation, the first configuration includes at least one configuration parameter of the SL DRX configuration information; and the second configuration includes at least one configuration parameter of the SL DRX configuration information.

According to a seventeenth aspect, an embodiment of this application provides a communication apparatus, including a processing unit, configured to determine first indication information, where the first indication information indicates a manner in which a second communication device sends first information; the manner includes: actively providing the first information to a first communication device, not actively providing the first information to a first communication device, or stopping providing the first information to a first communication device; and the first information is used to determine second SL DRX configuration information between the first communication device and the second communication device. The communication apparatus further includes a transceiver unit, configured to send the first indication information to the second communication device.

In a possible implementation, the processing unit is further configured to receive the first information from the second communication device.

In a possible implementation, the processing unit is further configured to determine the second SL DRX configuration information between the communication apparatus and the second communication device based on the first information; and the second SL DRX configuration information is associated with the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a radio resource control RRC message, a media access control MAC control element CE, or side link control information SCI.

According to an eighteenth aspect, an embodiment of this application further provides a communication apparatus, including a processing unit, configured to determine first indication information, where the first indication information indicates a manner in which a second communication device sends first information; and the manner includes: not actively providing the first information to a first communication device; and the first information is used to determine second Uu DRX configuration information between the first communication device and the second communication device. The communication apparatus further includes a transceiver unit, configured to send the first indication information to the second communication device.

In a possible implementation, the processing unit is further configured to receive the first information from the second communication device.

In a possible implementation, the processing unit is further configured to determine the second Uu DRX configuration information between the communication apparatus and the second communication device based on the first information; and the second Uu DRX configuration information is associated with the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a Uu RRC message, a media access control MAC control element CE, or DCI.

According to a nineteenth aspect, an embodiment of this application provides a communication apparatus, including a processing unit, configured to determine first request information, where the first request information is used to request a second communication device to send first information to a first communication device; and the first information is used to determine second DRX configuration information between the first communication device and the second communication device. The communication apparatus further includes a transceiver unit, configured to send the first request information to the second communication device.

In a possible implementation, the processing unit is further configured to receive second indication information from the second communication device, where the second indication information indicates the first communication device to request the second communication device to provide the first information.

In a possible implementation, the first request information includes a request reason; and the request reason includes one or more of the following information: configuring the second DRX configuration information and configuring second SL resource configuration information; or the first request information indicates one or more of the following information: configuring the second DRX configuration information and configuring second SL resource configuration information.

In a possible implementation, it is determined that a preset condition is met, and the first communication device sends the first request information to the second communication device, where the preset condition includes:

An access stratum AS layer of the first communication device triggers configuration of the second SL DRX configuration information or the second SL resource configuration information; or an upper layer of the first communication device triggers configuration of the second SL DRX configuration information or the second SL resource configuration information, where the upper layer includes an application layer and/or a vehicle wireless communication technology V2X layer.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the processing unit is further configured to receive the first information from the second communication device.

In a possible implementation, the processing unit is further configured to determine the second SL DRX configuration information between the communication apparatus and the second communication device; and the second SL DRX configuration information is associated with the first information.

In another possible implementation, the communication apparatus may include a processor (or referred to as a processing chip or a processing circuit) and a transceiver (or referred to as a communication circuit). The processor may be configured to invoke program instructions, to perform a processing function of the communication apparatus. The communication module may be used by the communication apparatus to perform communication.

Alternatively, the communication apparatus may include a processor, a memory, and a transceiver. The memory may store program instructions. The processor may be configured to invoke program instructions in the memory, to perform a processing function of the communication apparatus. The communication module may be used by the communication apparatus to perform communication.

According to a twentieth aspect, an embodiment of this application provides a communication apparatus, including: a processing unit, configured to determine first information, where the first information includes first DRX configuration information and/or first sidelink SL resource configuration information; and the first information is associated with a second communication device. The communication apparatus further includes a transceiver unit, configured to send the first information to a first communication device, so that the first communication device determines second DRX configuration information based on the first information.

In a possible implementation, the processing unit is further configured to:
receive the second DRX configuration information from the first communication device, where the second DRX configuration information is DRX configuration information between the first communication device and the second communication device, and the second DRX configuration information is associated with the first information.

In a possible implementation, the first DRX configuration information includes first SL DRX configuration information and/or Uu DRX configuration information.

In a possible implementation, the first DRX configuration information does not include the second DRX configuration information.

In a possible implementation, the processing unit is further configured to:
receive first indication information from the first communication device, where the first indication information indicates a manner in which the second communication device sends the first information; and the manner includes: actively providing the first information to the first communication device, not actively providing the first information to the first communication device, or stopping providing the first information to the first communication device.

In a possible implementation, the processing unit is further configured to send second indication information to the first communication device, where the second indication information indicates the first communication device to request the second communication device to provide the first information.

In a possible implementation, the first communication device performs SL communication with the second communication device, and the second indication information is carried in a PC5 RRC message, a MAC CE, or SCI.

In a possible implementation, the first communication device communicates with the second communication device through a Uu interface, and the first indication information is carried in a Uu RRC message, a MAC CE, or DCI.

In a possible implementation, the processing unit is further configured to:
receive first request information from the first communication device, where the first request information is used to request the second communication device to send the first information to the first communication device.

In a possible implementation, the first request information includes a request reason; and the request reason may include one or more of the following information: configuring the second DRX configuration information, configuring the Uu DRX configuration information, and configuring second SL resource configuration information.

In a possible implementation, the first communication device performs SL communication with the second communication device; and the first indication information indicates one or more of the following information: configuring the second DRX configuration information and configuring second SL resource configuration information.

In a possible implementation, the first communication device communicates with the second communication device through a Uu interface, and the first indication information indicates one or more of the following information: configuring the Uu DRX configuration information, configuring the second DRX configuration information, and configuring the second SL resource information.

In a possible implementation, the second communication device performs SL communication with the first communication device, and the second communication device is a transmit end; and the first DRX configuration information includes one or more of the following:
Uu DRX configuration information of the second communication device; and
third DRX configuration information of the second communication device used as a receive end, and/or a first identifier; and the first identifier includes a source identifier, a link identifier, a connection identifier, a resource pool identifier, a configuration authorization identifier, or a service identifier corresponding to the third DRX configuration information.

First SL resource configuration information includes:
configuration information of a transmit resource pool of the second communication device, and/or a channel busy rate CBR of the transmit resource pool.

In a possible implementation, the second communication device performs SL communication with the first communication device, and the second communication device is a receive end; and the first DRX configuration information includes one or more of the following:
Uu DRX configuration information of the second communication device; and
fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.

First SL resource configuration information includes:
configuration information of a receive resource pool of the second communication device, and/or a CBR of the receive resource pool.

In a possible implementation, the second communication device communicates with the first communication device through a Uu interface; and the first DRX configuration information includes one or more of the following:
fifth DRX configuration information of the second communication device and/or a third identifier; and the third identifier includes a destination identifier, a source identifier, a link identifier, a connection identifier, a source identifier-destination identifier pair, a resource pool identifier, a configuration authorization identifier, or a service identifier corresponding to the fifth DRX configuration information.

In a possible implementation, the first information further includes:
power level information of the second communication device.

In a possible implementation, the processing unit sends the first information in the following cases:
the first information changes; and/or
a first timer expires or the first timer does not run.

In a possible implementation, the processing unit is further configured to start the first timer when the transceiver unit sends the first information to the first communication device or after the transceiver unit sends the first information to the first communication device.

In a possible implementation, the second communication device performs SL communication with the first communication device; the processing unit is further configured to indicate the second DRX configuration information to an upper layer by using the AS layer of the second communication device; and the upper layer includes an application layer and/or a V2X layer.

In a possible implementation, the processing unit is further configured to:
  indicate third indication information to the upper layer by using the AS layer of the second communication device, where the third indication information includes DRX configuration information between the second communication device and a third communication device.

In a possible implementation, SL DRX configuration information between the second communication device and the first communication device includes a first configuration and a second configuration; the first configuration includes the second DRX configuration information; and the processing unit is further configured to: send the second configuration to the first communication device; and receive the first configuration from the second communication device.

In a possible implementation, SL DRX configuration information between the second communication device and the first communication device includes a first configuration and a second configuration; the first configuration includes the second DRX configuration information; and the processing unit is further configured to: receive the first configuration from the first communication device; and send the second configuration to the first communication device.

According to a twenty-first aspect, an embodiment of this application provides a communication apparatus, including a processing unit, configured to determine that the following cases are met:
  First information changes; and/or a first timer expires or the first timer does not run; and
  a transceiver unit, configured to send the first information, where the first information is used to determine first SL DRX configuration information between a first communication device and a second communication device.

In a possible implementation, the processing unit is further configured to start the first timer when the transceiver unit sends the first information to the first communication device or after the transceiver unit sends the first information to the first communication device.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

According to a twenty-second aspect, an embodiment of this application provides a communication apparatus, including a transceiver unit, configured to receive first indication information from a first communication device; the first indication information indicates a manner in which a second communication device sends first information; the manner includes: actively providing the first information to the first communication device, not actively providing the first information to the first communication device, or stopping providing the first information to the first communication device; and the first information is used to determine second SL DRX configuration information between the first communication device and the second communication device. The communication apparatus further includes a processing unit, configured to determine the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a radio resource control RRC message, a media access control MAC control element CE, or side link control information SCI.

According to a twenty-third aspect, an embodiment of this application further provides a communication apparatus, including: a transceiver unit, configured to receive first indication information from a first communication device, where the first indication information indicates a manner in which a second communication device sends first information; the manner includes: not actively providing the first information to the first communication device; and the first information is used to determine second SL DRX configuration information between the first communication device and the second communication device. The communication apparatus further includes a processing unit, configured to determine the first information.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the first indication information is carried in a Uu RRC message, a media access control MAC control element CE, or DCI.

According to a twenty-fourth aspect, an embodiment of this application provides a communication apparatus, including: a transceiver unit, configured to receive first request information from a first communication device, where the first request information is used to request a second communication device to send first information to the first communication device; and the first information is used to determine second DRX configuration information between the first communication device and the second communication device. The communication apparatus further includes a processing unit, configured to determine the first information.

In a possible implementation, the method further includes sending second indication information, where the second indication information indicates the first communication device to request the second communication device to provide the first information.

In a possible implementation, the first request information includes a request reason; and the request reason includes one or more of the following information: configuring the second DRX configuration information and configuring second SL resource configuration information; or the first request information indicates one or more of the following information: configuring the second DRX configuration information and configuring second SL resource configuration information.

In a possible implementation, it is determined that a preset condition is met, and the first communication device sends the first request information to the second communication device, where the preset condition includes:

An access stratum AS layer of the first communication device triggers configuration of the second SL DRX configuration information or the second SL resource configuration information; or an upper layer of the first communication device triggers configuration of the second SL DRX configuration information or the second SL resource configuration information, where the upper layer includes an application layer and/or a vehicle wireless communication technology V2X layer.

In a possible implementation, the first information includes first discontinuous reception DRX configuration information and/or first sidelink SL resource configuration information from the second communication device.

In a possible implementation, the first DRX configuration information is associated with the second communication device; and the first SL resource configuration information is associated with the second communication device.

In a possible implementation, the second communication device sends the first information to the first communication device.

In a possible implementation, the first configuration includes at least one configuration parameter of the SL DRX configuration information; and the second configuration includes at least one configuration parameter of the SL DRX configuration information. In another possible implementation, the communication apparatus may include a processor (or referred to as a processing chip or a processing circuit) and a transceiver (or referred to as a communication circuit). The processor may be configured to invoke program instructions, to perform a processing function of the communication apparatus. The communication module may be used by the communication apparatus to perform communication.

Alternatively, the communication apparatus may include a processor, a memory, and a transceiver. The memory may store program instructions. The processor may be configured to invoke program instructions in the memory, to perform a processing function of the communication apparatus. The communication module may be used by the communication apparatus to perform communication.

According to a twenty-fifth aspect, this application provides a communication system. For example, the communication system may include a communication device configured to implement any one of the first aspect to the twelfth aspect or the possible designs of the first aspect to the twelfth aspect.

According to a twenty-sixth aspect, this application provides a computer-readable storage medium, including program instructions. When the program instructions are applied to a computer, the computer is enabled to perform the communication device according to any one of the first aspect to the twelfth aspect or the possible designs of the first aspect to the twelfth aspect.

According to a twenty-seventh aspect, an embodiment of this application provides a computer program product. When the computer program product runs on a computer, the computer is enabled to perform the communication device according to any one of the first aspect to the twelfth aspect or the possible designs of the first aspect to the twelfth aspect.

According to a twenty-eighth aspect, an embodiment of this application provides a system chip. The system chip may include a processor, and may further include a memory (or the system chip is coupled to a memory), and the system chip executes program instructions in the memory, to execute a communication device that performs any one of the first aspect to the twelfth aspect or the possible designs of the first aspect to the twelfth aspect. "Coupling" means that two components are directly or indirectly combined with each other. For example, coupling may mean that the two components are electrically connected.

For technical effects that can be achieved in the second aspect to the twenty-eighth aspect, refer to descriptions of technical effects that can be achieved in corresponding possible design solutions in the first aspect. Details are not described herein again in this application.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1:
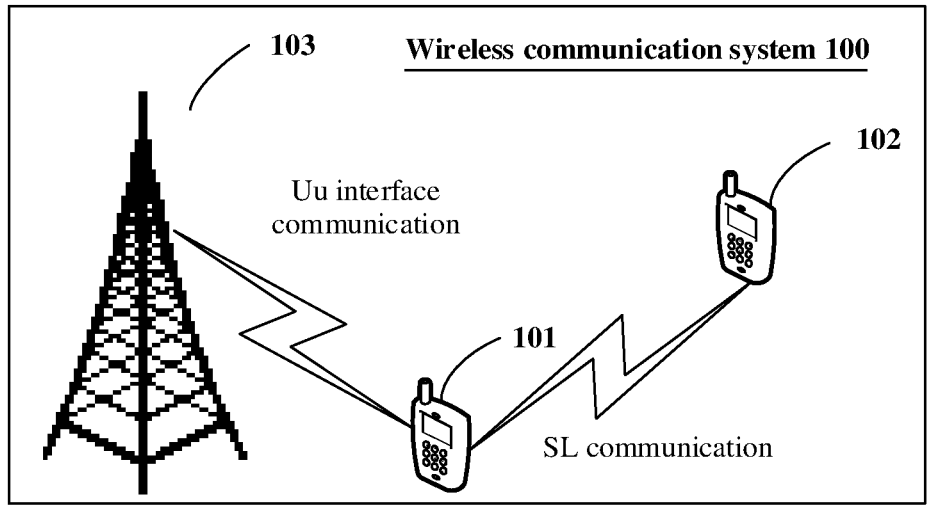
FIG. 1 is a schematic diagram of a wireless communication system according to this application.

As shown in FIG. 1, a wireless communication system 100 provided in an embodiment of this application includes a terminal 101, a terminal 102, and a network device 103. An application scenario of the wireless communication system 100 includes but is not limited to a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, a new radio (NR) communication system, an NR internet of vehicles system, a future internet of vehicles system based on mobile communication, or the like. It should be understood that the wireless communication system 100 provided in this embodiment of this application is applicable to both a low-frequency scenario (sub 6G) and a high-frequency scenario (above 6G).

For example, the terminal 101 and the terminal 102 may be devices such as a terminal, a mobile station (MS), a mobile terminal, user equipment (UE), or apparatuses such as a chip or a chip system. The terminal 101 can communicate with one or more network devices in one or more communication systems, and receive a network service provided by the network device. The network device herein includes but is not limited to the network device 103 shown in the figure. For example, in this embodiment of this application, the terminal 101 and the terminal 102 each may be a mobile phone (or referred to as a "cellular" phone) or a computer having a mobile terminal. Alternatively, the terminal 101 and the terminal 102 each may be a portable, pocket-sized, handheld, computer built-in, or vehicle-mounted mobile apparatus. Alternatively, the terminal 101 and the terminal 102 each may be a communication chip having a communication module. It should be understood that the terminal 101 may be configured to support communication with the network device by using a universal user to network air interface (Uu). The terminal 101 and the terminal 102 may be configured to support SL transmission. For example, SL communication may be performed between the terminal 101 and the terminal 102 by using a direct communication (PC5) air interface (an air interface for SL communication between terminals). It should be understood that, in this application, SL communication may include SL unicast communication, multicast communication, and broadcast communication. Alternatively, the terminal 101 and the terminal 102 may be configured to support relay transmission. For example, the terminal 102 serves as a remote communication device, and the terminal 101 may serve as a relay terminal apparatus, to implement relay transmission. For example, the terminal 101 may be considered as a first communication device, and the first communication device and a second communication device implement the communication method provided in this application.

For example, in this application, an SL connection may be identified by using an identifier (or referred to as identification information) of the SL connection. An SL connection between the terminal 101 and the terminal 102 is used as an example. An identifier of the SL connection may include an identifier of the terminal 101 and/or an identifier of the terminal 102. Alternatively, the identifier of the SL connection may include an SL connection identifier or an SL link identifier (PC5 link identifier) of the SL connection.

It should be understood that the SL connection in this application may be a physical SL connection. In other words, there is only one SL connection between two independent communication devices at a physical layer. In this case, there is only one physical SL connection between the first communication device and the second communication device.

For example, for a unicast SL connection, when the terminal 101 serves as a transmit end of the SL connection, that is, when the terminal 101 performs sending to the terminal 102 by using the SL connection, a source layer 2 (L2) identifier (or a source layer 1 identifier) of the SL connection may include a layer 2 (L2) identifier of the terminal 101 (or a layer 1 (L1) identifier of the terminal 101), and a destination layer 2 (L2) identifier (or a destination layer 1 identifier) of the SL connection may include a layer 2 identifier of the terminal 102 (or a layer 1 identifier of the terminal 102).

Alternatively, an SL connection may include a logical SL connection. There may be a plurality of SL connections between two independent communication devices at a physical layer. In this case, different SL connections may be distinguished by using identifier pairs (or referred to as identifier pair information or identifier-pair information). An identifier pair may include a source identifier and a destination identifier of an SL connection. An SL connection between the terminal 101 and the terminal 102 is used as an example. If the terminal 101 is used as a transmit end of the SL connection, a source identifier of the SL connection may include a layer 2 identifier (or a layer 1 identifier) of the terminal 101, and a destination identifier may include a layer 2 identifier (or a layer 1 identifier) of the terminal 102. Similarly, if the terminal 102 is used as a transmit end of the SL connection, a source identifier of the SL connection may include a layer 2 identifier (or a layer 1 identifier) of the terminal 102, and a destination identifier may include a layer 2 identifier (or a layer 1 identifier) of the terminal 101.

If the SL connection is used for multicast or broadcast sending of the terminal 101, a source identifier of the SL connection may include a layer 2 identifier of the terminal 101 (or a layer 1 identifier of the terminal 101), and a destination identifier of the SL connection may include a layer 2 identifier corresponding to a multicast or broadcast SL service (or a layer 1 identifier corresponding to a multicast or broadcast SL service).

The network device 103 may include a base station (BS), or may include a base station, a radio resource management device configured to control a base station, and the like. The base station herein may be a base station (BTS) in a GSM or CDMA system, may be a NodeB (NB) in a WCDMA system, may be an evolved NodeB (eNB or eNodeB) in an LTE system, a small cell (micro/pico eNB), or a transmission/reception point (TRP), or may be a radio controller in a cloud radio access network (CRAN) scenario. Alternatively, a base station 200 may be a relay station, an access point, a vehicle-mounted device, a wearable device, a base station in a future 5G network or a base station in a future evolved public land mobile network (PLMN) network, for example, an NR base station. This is not limited in this embodiment of this application.

As described in the background, when a DRX mechanism is configured for a terminal device, the terminal device periodically enters a sleep mode at some time. In the sleep mode, the terminal device does not need to listen to a PDCCH. When the terminal device needs to listen to the PDCCH, the terminal device wakes up from the sleep mode, to reduce power of the terminal device. However, when the DRX mechanism is not configured for the terminal device or the terminal device does not perform DRX, the terminal device continuously listens to the PDCCH. As a result, power consumption is high. Based on the wireless communication system shown in FIG. 1, DRX configuration information or SL resource configuration information between the terminal 101 and the terminal 102 may be independently configured by the terminal 101 or the terminal 102. Alternatively, DRX configuration information or SL resource configuration information between the terminal 101 and the terminal 102 may be configured by using the network device 103, and then transmitted to the terminal 101 and the terminal 102. Uu DRX configuration information between the network device 103 and the terminal 101 is configured by using the network device, and the terminal 101 cannot independently configure the Uu DRX configuration information. FIG. 1 describes an example in which the wireless communication system includes one network device and two terminals. However, in actual application, a quantity of network devices and a quantity of terminals in the wireless communication system are not limited. For example, start time of a timer of the Uu DRX configuration information between the terminal 101 and the network device 103 is 1 second to 5 seconds, and start time of a timer of the DRX configuration information between the terminal 101 and the terminal 102 is 5 seconds to 10 seconds. In this case, the terminal 101 is always in a working state in a time period of 1 s to 10 s. As a result, power consumption of the terminal 101 is wasted.

In this application, information related to configuration of the DRX configuration information and/or the SL resource configuration information is considered, so that active time of a plurality of pieces of configuration information of a same terminal overlap as much as possible. Therefore, power consumption of the terminal can be reduced. It should be noted that the active time may be understood as working time. This is not specifically limited herein. For example, in this application, the DRX configuration information between the terminal 101 and the terminal 102 is configured after the timer of the Uu DRX configuration information between the terminal 101 and the network device 103 starts from is to 5 s. If the start time of the timer determined in this manner is 2 seconds to 6 seconds, the terminal 101 only needs to work in a time period of 1 second to 6 seconds, and does not need to work continuously for 10 seconds. Therefore, power consumption of the terminal 101 can be reduced.

Figure 2:
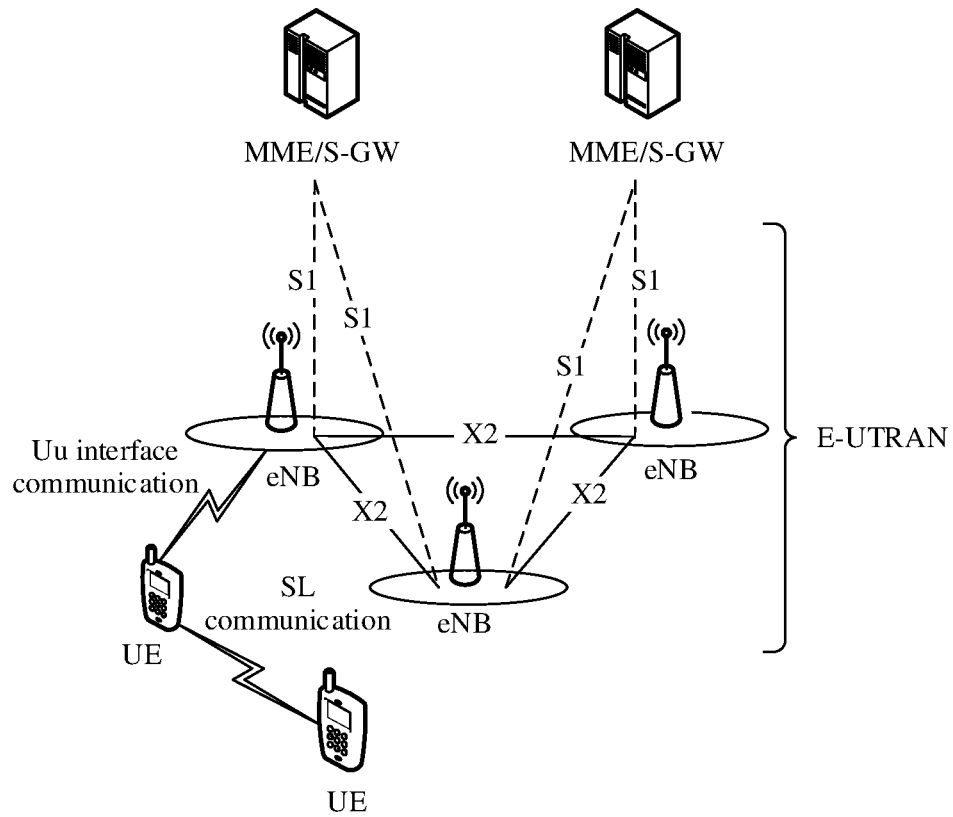
FIG. 2 is a schematic diagram of a system architecture according to this application.

The following describes a system architecture to which this application may be applied. As shown in FIG. 2, an evolved-universal terrestrial radio access network (E-UTRAN) may include a plurality of eNBs, and provides an E-UTRA user plane and control plane protocol termination node for a terminal (for example, the terminal 101). The eNBs are interconnected by using X2 interfaces. The eNBs are also connected to a mobility management entity (MME) by using an S1-MME interface, and are connected to a serving gateway (S-GW) by using an S1-U interface, to implement a connection between an access network and a 4G core network. Each eNB may be communicatively connected to UE through a Uu interface, and terminals may be communicatively connected to each other through an SL.

Figure 3:
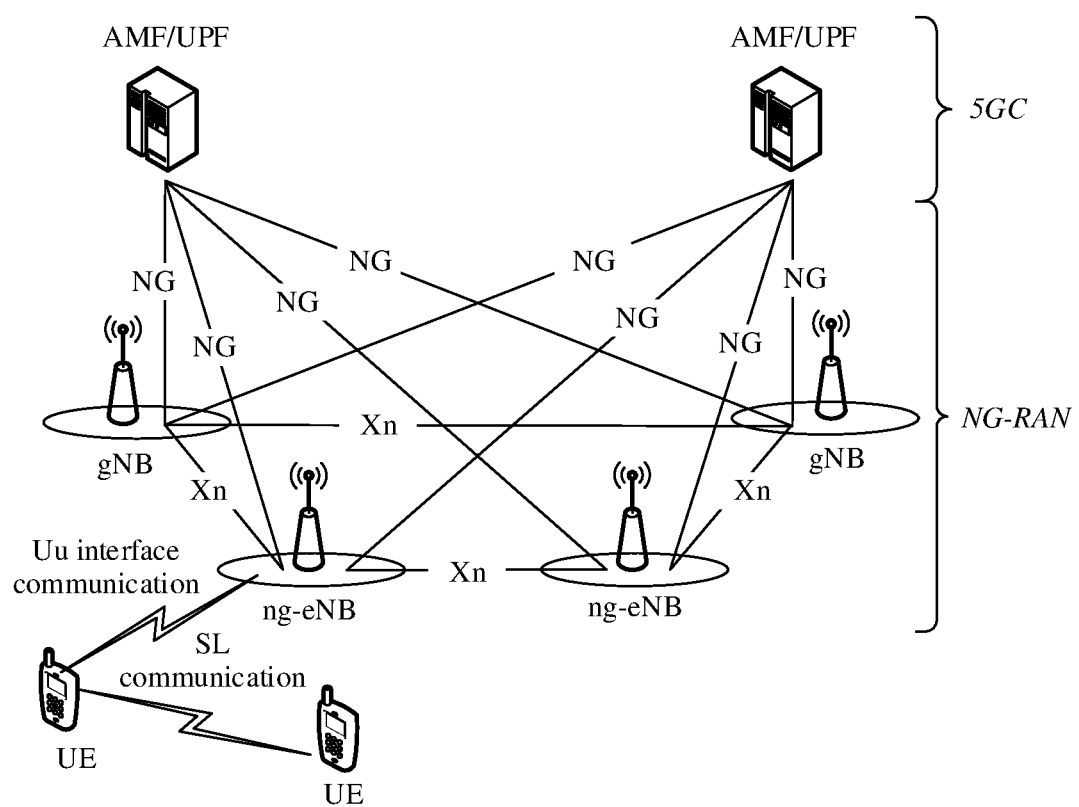
FIG. 3 is a schematic diagram of another system architecture according to this application.

As shown in FIG. 3, in a next generation-radio access network (NG-RAN), a gNB provides an NR user plane and control plane protocol termination node for a terminal (for example, the terminal 101), and a ng-eNB provides an E-UTRA user plane and control plane protocol terminal for a terminal (for example, the terminal 101). The gNB and the ng-eNB are interconnected by using an Xn interface, and the gNB and the ng-eNB are connected to the 5G core network (5GC) by using an NG interface. Each gNB may be communicatively connected to UE through a Uu interface, and terminals may be communicatively connected to each other through an SL. When the gNB or the terminal needs to configure the DRX configuration information and/or the SL resource configuration information, the solutions of this application may be applied to reduce power consumption of the terminal.

Embodiment 1

Figure 4:
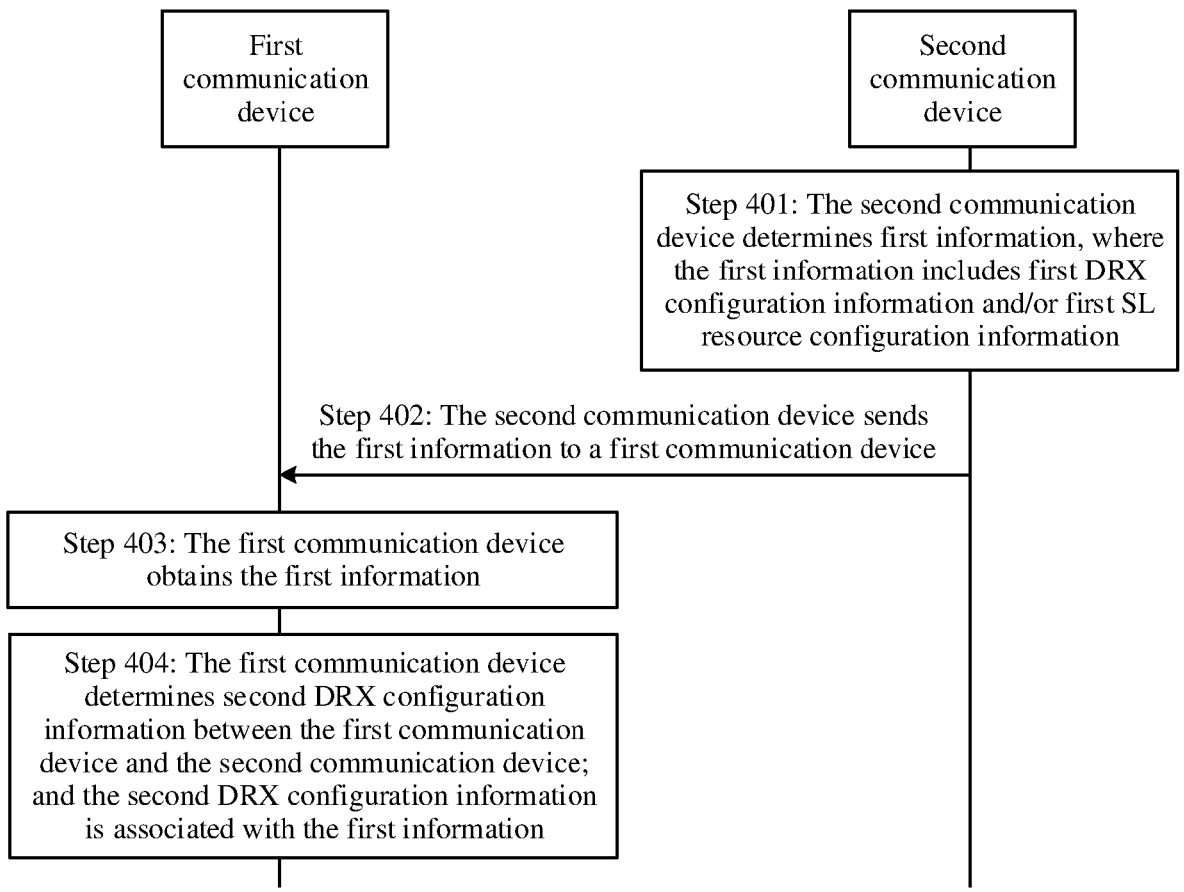
FIG. 4 is a schematic flowchart of a communication method according to this application.

The communication method provided in this embodiment of this application is described by using a communication system shown in FIG. 2 and/or FIG. 3 as an example. The communication method may be performed by a first communication device and a second communication device. It should be understood that the first communication device may be a processor or a chip. A form of the first communication device is not specifically limited again. Similarly, the second communication device also has a form the same as that of the first communication device. Refer to FIG. 4. The communication method provided in this application may be performed as follows:

Step 401: The second communication device determines first information, where the first information includes first DRX configuration information and/or first SL resource configuration information.

Step 402: The second communication device sends the first information to the first communication device.

Step 403: The first communication device obtains the first information.

Step 404: The first communication device determines second DRX configuration information between the first communication device and the second communication device, and the second DRX configuration information is associated with the first information.

It should be noted that the first information is information that has been configured by the second communication device. The first information may be understood as reference information or auxiliary information, and that the first information has been configured may be understood as that the first information has been configured and used, or the first information is not used but is candidate DRX configuration information. If the first information has been configured and stored in the second communication device, DRX configuration information and/or SL resource configuration information configured between the second communication device and another communication device may be used as the first information. The first DRX configuration information may be DRX configuration information configured between the second communication device and another communication device. For example, if DRX configuration information 1 is configured between the second communication device and a third communication device, the first information may include the configuration information 1. For example, if SL resource configuration information 2 is further configured between the second communication device and the first communication device, the second communication device may send the configuration information 2 as the first information to the first communication device. In actual application, the first information may include at least one of the configuration information 1 and the configuration information 2, or may include two types of configuration information, and may be set based on a configuration requirement of the second DRX configuration information. This is not specifically limited herein.

In addition, that the first communication device determines the second DRX configuration information between the first communication device and the second communication device, and the second DRX configuration information is associated with the first information may be understood as follows: The first communication device determines the second DRX configuration information between the first communication device and the second communication device by referring to the first information, or it may be understood as that the first information is used to determine the second DRX configuration information. When the first communication device determines the second DRX configuration information, the first communication device refers to the first information sent by the second communication device, so that when the first communication device determines a configuration parameter of the second DRX configuration information, the first communication device may refer to the first information that has been configured by the second communication device. In this way, some parameters of the second DRX configuration information overlap with some parameters of the first information as much as possible, and power usage of the second communication device is considered as much as possible, to reduce power consumption of the second communication device. For example, when the first communication device configures the second DRX configuration information, a period of the configuration parameter of the second DRX configuration information may be set based on a period of a configuration parameter of the first DRX configuration information reported by the second communication device.

In addition, the first communication device may be a network device, a terminal, and an RSU, and the second communication device may also be a network device, a terminal, and a roadside device. If the first communication device is a network device, the second communication device may be a terminal or a roadside device. If the first communication device is a terminal, the second communication device may be a network device, an RSU, or a terminal. Similarly, if the first communication device is a roadside device, the second communication device may be a network device or a terminal. Device types of the first communication device and the second communication device are not specifically limited in this application.

In a possible implementation, the first DRX configuration information mentioned in step 401 may include first SL DRX configuration information and/or Uu DRX configuration information. It should be noted that the first DRX configuration information is DRX configuration information configured between the second communication device and a communication device other than the first communication device. If the second communication device performs SL communication with a third communication device, and DRX configuration information A is configured between the second communication device and the third communication device, the DRX configuration information A is the first SL DRX configuration information. In addition to performing SL communication with the third communication device, the second communication device further communicates with a fourth communication device through a Uu interface, and DRX configuration information B is configured between the second communication device and the fourth communication device, the DRX configuration information B is the Uu DRX configuration information. Because the second communication device not only performs SL communication with the third communication device, but also communicates with the fourth communication device through the Uu interface, the first DRX configuration information may include one or both of the DRX configuration information A and the DRX configuration information B. This is not specifically limited herein. In addition, it should be noted that configuration parameters of both the SL DRX configuration information and the Uu DRX configuration information may include: a period, active duration (onduration), a start offset (startoffset), a retransmission-related timer (such as drx-RetransmissionTimerSL and drx-HARQ-RTT-TimerSL), and the like. A type of the configuration parameters is not specifically limited herein.

If the first communication device performs SL communication with the second communication device, the first SL resource configuration information is resource configuration information that can be used by the second communication device during SL communication, where the resource configuration information that can be used by the second communication device may be a part of the first SL resource configuration. The resource configuration information may be preconfigured, or may be obtained from a communication device. The resource configuration information may be configuration information of a resource pool, or may be a configured grant configuration.

Figure 5:
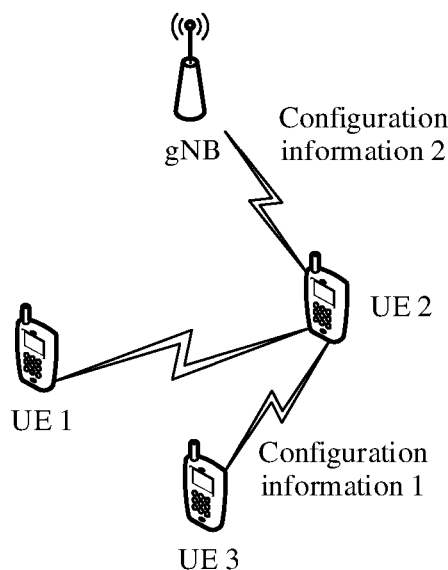
FIG. 5 is a schematic diagram of an application scenario of a communication method according to this application.

Because device types of the first communication device and the second communication device are uncertain, DRX configuration information that has been configured by the second communication device is uncertain, and may include the SL DRX configuration information, or may include the Uu DRX configuration information. This is not specifically limited in this application. The first communication device may notify the second communication device of a configuration requirement of the second DRX configuration information, so that the second communication device reports one or more of configuration requirements of the second DRX configuration information. Alternatively, the second communication device may actively report one or more of SL connections between the second communication device and the first communication device. One or more types of the first DRX configuration information may be flexibly selected when the second DRX configuration information is determined. Therefore, this manner can improve flexibility of configuring the second DRX configuration information. As shown in FIG. 5, the first communication device is UE 1, the second communication device is also UE 2, the UE 2 is connected to the UE 3 through an SL, and the UE 2 is communicatively connected to a base station (gNB) through a Uu interface. SL DRX configuration information 1 is configured between the UE 2 and the UE 3, and Uu DRX configuration information 2 is configured between UE 2 and the base station. The first DRX configuration information may include the configuration information 1, and may further include the configuration information 2. Alternatively, the first DRX configuration information may include both the configuration information 1 and the configuration information 2. The configuration information 1 may include some or all configuration parameters in the first DRX configuration information, for example, a period, active duration (onduration), a start offset (startoffset), and the like. The Uu DRX configuration information 2 may also include a plurality of configuration parameters, and the configuration information 2 may include some or all of the configuration parameters in the first DRX configuration information, such as a period and a start offset (startoffset).

In addition, it should be noted that the first DRX configuration information does not include the second DRX configuration information. It may also be understood that a parameter type of a configuration parameter of the first DRX configuration information is different from a parameter type of a configuration parameter of the second DRX configuration information. Alternatively, it may be understood that a parameter value of a configuration parameter of the first DRX configuration information is different from a parameter value of a configuration parameter of the second DRX configuration information. Alternatively, it may be understood that a parameter value and a parameter type of a configuration parameter of the first DRX configuration information are different from those of a configuration parameter of the second DRX configuration information. For example, the first DRX configuration information is SL DRX configuration information A that has been configured when the second communication device performs SL communication with a third communication device, and the first communication device may determine the second DRX configuration information by referring to the first DRX configuration information. A value of a configuration parameter of the second DRX configuration information may be different from values of some configuration parameters of the configuration information A, a type of a configuration parameter of the second DRX configuration information may be different from a type of a configuration parameter of the configuration information A, or both a type and a value of a configuration parameter of the second DRX configuration information may be different from a type and a value of a configuration parameter of the configuration information A.

In other words, the second DRX configuration information is not selected, as the second DRX configuration information, from DRX configuration information that has been configured by the second communication device. In this application, the first communication device determines the second DRX configuration information by referring to the first information that has been configured between the second communication device and another communication device other than the first communication device. The first information referred to when the second DRX configuration information is configured in this application does not include the second DRX configuration information, so that the DRX configuration information configured between the first communication device and the second communication device better adapts to requirements of the first communication device and the second communication device, to avoid a case that other configured DRX configuration information is literally transferred.

Then, if the first communication device determines that the first information obtained from the second communication device may be used as the second DRX configuration information between the second communication device and the first communication device, or when the first communication device needs to send the second DRX configuration information to the second communication device, the second communication device may receive the second DRX configuration information from the first communication device.

For example, before the first communication device obtains the first information, the first communication device may send first indication information or first request information to the second communication device, so that the second communication device learns when or how to provide the first information to the first communication device. The first communication device may send the first indication information or the first request information to the second communication device in the following manners.

Manner 1: The first communication device sends the first indication information before the first communication device obtains the first information.

It should be noted that the first communication device sends the first indication information to the second communication device, where the first indication information indicates a manner in which the second communication device sends the first information; and the manner includes: actively providing the first information to the first communication device, not actively providing the first information to the first communication device, or stopping providing the first information to the first communication device. It should be noted that signaling or signals used in different manners may be different or the same. This is not specifically limited herein. For example, the second communication device actively provides the first information by using first signaling, the second communication device does not actively provide the first information by using second signaling, and the second communication device stops providing the first information by using third signaling. Alternatively, the second communication device actively provides, does not actively provide, and stops providing the first information by using the first signaling.

During actual execution, the first communication device may periodically send the first indication information to the second communication device, may send the first indication information within a specified time period, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, after the second communication device receives the first indication information, the second communication device may immediately report the first information, or may report the first information at specified time or periodically report the first information according to a rule specified by the second communication device. In this application, a manner of reporting the first information may be flexibly controlled by using the first indication information. For example, when SLDrxAssitanceInfo (that is, the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device.

In addition, the second communication device may also send information to the first communication device to notify the first communication device of a manner in which the second communication device may provide the first information. The first communication device may feed back the information sent by the second communication device to notify the second communication device of a manner in which the first information is reported. For example, the second communication device sends a notification to the first communication device, where the communication message indicates that the second communication device may actively or not actively provide the first information. After the first communication device obtains the notification, the first communication device may send, to the second communication device, a manner in which the first communication device expects the second communication device to provide the first information. If the manner is that the second communication device does not actively provide the first information, the second communication device does not need to actively provide the first information.

Manner 2: The first communication device sends the first request information before the first communication device obtains the first information.

It should be noted that the first communication device sends the first request information to the second communication device, where the first request information is used to request the second communication device to send the first information to the first communication device. During actual execution, the first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In addition, the first request information includes a request reason. When the first communication device performs SL communication with the second communication device, the request reason may include that the first communication device needs to configure the second DRX configuration information, and/or the first communication device needs to configure second SL resource configuration information. When the first communication device communicates with the second communication device through a Uu interface, the request reason may include that the first communication device needs to configure the second DRX configuration information, the first communication device needs to configure Uu DRX configuration information, and/or the first communication device needs to configure second SL resource configuration information. In this way, signaling overheads for sending the first information may be reduced.

In addition, for different types of first communication devices or second communication devices, information indicated by the first request information is different. If the first communication device performs SL communication with the second communication device, the first request information may indicate one or more of the following information: The first communication device needs to configure the second DRX configuration information, and the first communication device needs to configure the second SL resource configuration information. The first communication device notifies, by using the first request information, the second communication device of a reason why the first information needs to be reported, that is, the first communication device needs to configure the second DRX configuration information and/or the second SL resource configuration information, so that the second communication device reports the first information.

If the first communication device communicates with the second communication device through the Uu interface, the first request information may indicate one or more of the following information: configuring the Uu DRX configuration information, configuring the second DRX configuration information, and configuring second SL resource configuration information. The first communication device notifies, by using the first request information, the second communication device of a reason why the first information needs to be reported, that is, the first communication device needs to configure the second DRX configuration information, the second SL resource configuration information, and/or the Uu DRX configuration information, so that the second communication device reports the first information.

In addition, when the first communication device performs SL communication with the second communication device, and it is determined that the first communication device meets the following preset condition, the first communication device sends the first request information to the second communication device, where the preset condition includes the following.

Condition 1: An AS layer of the first communication device triggers configuration of the second DRX configuration information or the second SL resource configuration information.

Condition 2: An upper layer of the first communication device triggers configuration of the second DRX configuration information or the second SL resource configuration information, where the upper layer includes an application layer and/or a V2X layer.

It should be noted that, when it is determined herein that the first communication device meets the preset condition, it is not limited that the first communication device definitely needs to perform an action of determining whether the preset condition is met. It may also be understood that when the first communication device meets the preset condition, the first communication device sends the first request information to the second communication device. In addition, in this application, the first communication device sends the first request information only when the first communication device meets the preset condition, so that service scheduling of the first communication device is adapted to the second DRX configuration information, to reduce memory occupation as much as possible.

It should be further noted that the second communication device may send second indication information to the first communication device, so that the first communication device may request the first information from the second communication device. The first communication device may send the first request information to the second communication device after the first communication device receives the second indication information from the second communication device.

Before the first communication device obtains the first information, the first communication device sends information to the second communication device in the manner 1 or manner 2, so that the second communication device learns when or how to provide the first information to the first communication device.

In addition, for the first communication device and the second communication device, if different communication connection manners are used between the first communication device and the second communication device, signaling used by the first communication device to carry the first indication information or the first request information is also different. If the first communication device performs SL communication with the second communication device, the first indication information or the first request information may be carried in PC5 RRC information, a MAC CE, or SCI. If the first communication device and the second communication device are communicatively connected through a Uu interface, the first indication information or the first request information may be carried in Uu RRC information, a MAC CE, or DCI.

It should be further noted that the second communication device sends the first information in the following cases, and the first communication device obtains the first information in the same cases:

The first information changes; and/or a first timer expires or the first timer does not run.

It should be noted that a change of the first information refers to a parameter update in the first information, for example, a parameter increase, a parameter decrease, or a parameter value change. The parameter increase may be understood as that a quantity of parameters or a type of parameters in the first information increases. The parameter decrease may be understood as that a quantity of parameters or a type of parameters in the first information decreases. The parameter value change may be understood as that a value of a parameter in the first information changes, or may be understood as that a change amplitude of a value of a parameter in the first information exceeds a preset threshold or is lower than a preset threshold. In addition, after the second communication device sends the first information, both a first timer of the second communication device and a first timer of the first communication device are started. In this manner, a case in which the second communication device frequently reports the first information is avoided, and a case in which the second communication device does not report the first information when the first communication device needs the first information is also avoided.

The following separately describes a case in which the first communication device and the second communication device that are connected in different connection manners, and the following further describes the first information sent by the second communication device when the first communication device is used as a receive end or a transmit end.

The first communication device performs SL communication with the second communication device, the first communication device is a receive end, and the second communication device is a transmit end. In actual application, based on a configuration requirement of the first communication device, the first DRX configuration information may include one or more of the following:

Uu DRX configuration information of the second communication device;

third DRX configuration information of the second communication device used as a receive end, and/or a first identifier; and the first identifier includes a source identifier, a link identifier, a connection identifier, a resource pool identifier, a configuration authorization identifier, a service identifier, a resource pool identifier, a configuration authorization identifier, or a service identifier corresponding to the third DRX configuration information.

First SL resource configuration information may include:

configuration information of a transmit resource pool of the second communication device, and/or a CBR of the transmit resource pool; and configuration information of a receive resource pool of the second communication device, and/or a CBR of the receive resource pool.

Figure 6:
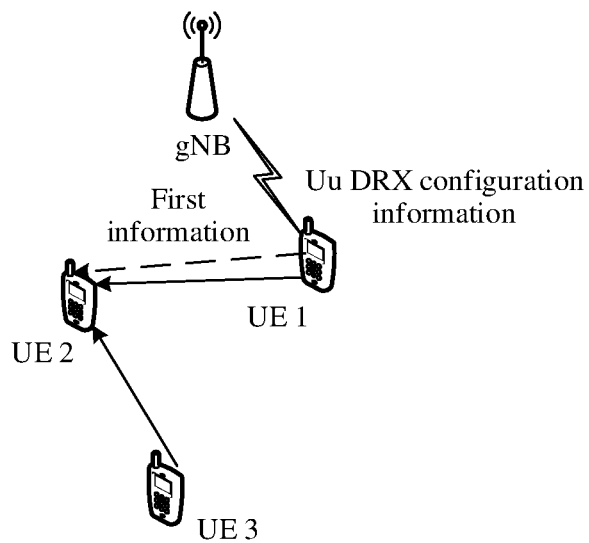
FIG. 6 is a schematic diagram of an application scenario of a communication method according to this application.

It should be noted that the Uu DRX configuration information of the second communication device is Uu DRX configuration information that has been configured between the second communication device and another communication device when the second communication device communicates with the another communication device through a Uu interface, and the first communication device configures the second DRX configuration information with reference to the Uu DRX configuration information, so that active time of the Uu DRX configuration information overlaps with active time of the second DRX configuration information as much as possible, to reduce power consumption of the second communication device. As shown in FIG. 6, the first communication device is represented by using UE 2, the second communication device is represented by UE 1, and a base station may be used as another communication device for which Uu DRX configuration information has been configured between the base station and the UE 1. In addition, UE 3 is further shown in this figure, and the UE 3 sends data to the UE 1. The UE 1 may send the first information to the UE 2, where the first information may include the Uu DRX configuration information between the UE 1 and the base station; and third DRX configuration information of the second communication device used as a receive end, and/or a first identifier; and the first identifier includes a source identifier, a link identifier, a connection identifier, a resource pool identifier, a configuration authorization identifier, or a service identifier corresponding to the third DRX configuration information. There may be a plurality of pieces of third DRX configuration information, and different DRX configuration information is corresponding to different source identifiers, link identifiers, and connection identifiers.

In addition, it should be noted that, if there are a plurality of pieces of third DRX configuration information of the second communication device used as a receive end, the plurality of pieces of third DRX configuration information may be distinguished by using the first identifier, so that the first communication device learns that the third DRX configuration information is DRX configuration information between the second communication device and a specific communication device, or that the third DRX configuration information is DRX configuration information for a specific link or connection. For example, DRX configuration information between the second communication device and a third communication device may be indicated by using a source identifier 1, and DRX configuration information between the second communication device and a fourth communication device may be indicated by using a source identifier 2. In actual application, a link identifier or a connection identifier may also be used for indication. This is not specifically limited herein.

The transmit resource pool of the second communication device may include one or more types of transmit resource pools, and each transmit resource pool corresponds to a CBR of the transmit resource pool. If a current CBR of a transmit resource pool of the second communication device is high, a time domain interval of the transmit resource pool may be ignored when the first communication device determines the second DRX configuration information. Based on the configuration information of the transmit resource pool, the first communication device determines proper SL DRX configuration information between the first communication device and the second communication device, so that active time or active duration (onduration) of the SL DRX configuration information greatly overlaps with time domain of the transmit resource pool.

Each piece of (Per) resource pool information may be corresponding to one piece of DRX configuration information. For example, SL DRX configuration information A is correspondingly used when the second communication device performs SL transmission by using a transmit resource pool 1, the SL DRX configuration information A may be indicated by an identifier 1 of the transmit resource pool.

Each service identifier (ID) may be corresponding to one piece of DRX configuration information. For example, if the SL DRX configuration information A is correspondingly used when an SL service 1 is transmitted between the second communication device and a third communication device, the SL DRX configuration information A may be indicated by an identifier of the service 1. If SL DRX configuration information B is correspondingly used when an SL service 2 is transmitted between the second communication device and the third communication device, the SL DRX configuration information B may be indicated by an identifier of the service 2.

In actual application, the first identifier, first resource pool information, or the service identifier may be selected to indicate the third DRX configuration information, or even the first identifier, the first resource pool information, and the service identifier may jointly indicate the third DRX configuration information. This is not specifically limited herein.

Figure 7:
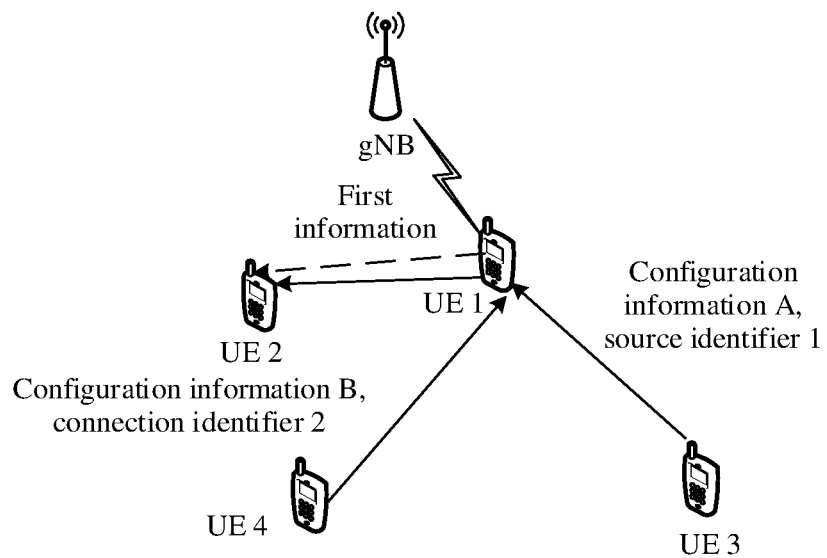
FIG. 7 is a schematic diagram of an application scenario of a communication method according to this application.

The second communication device is used as a data transmit end of the first communication device. However, for another communication device that may be used as a data receive end, when the first communication device configures the second DRX configuration information, the first communication device may refer to the third DRX configuration information of the second communication device used as a receive end. In this way, active time of the third DRX configuration information overlaps with active time of the second DRX configuration information as much as possible, to reduce power loss of the second communication device. As shown in FIG. 7, the first communication device is represented by using UE 2, the second communication device is represented by using UE 1, and UE 3 and UE 4 are other communication devices for which the third DRX configuration information has been configured between the UE 3/the UE 4 and the UE 1. The third DRX configuration information between the UE 1 and the UE 3 is configuration information A, the UE 3 is used as a transmit end of the UE 1, the UE 1 is used as a receive end of the UE 3, and the configuration information A is configured between the UE 1 and the UE 3. The configuration information A may be indicated by using an L2 identifier or an L1 identifier of the UE 3, for example, a source identifier 1, may be indicated by using a link identifier 1 between the UE 1 and the UE 3, or may be indicated by using a connection identifier 1 between the UE 1 and the UE 3. In FIG. 7, the source identifier 1 indicates the configuration information A. However, in actual application, the DRX configuration information A is indicated by using a source identifier, a link identifier, or a connection identifier. This is not limited. The third DRX configuration information between the UE 1 and the UE 4 is configuration information B, the UE 4 is used as a transmit end of the UE 1, and the UE 1 is used as a receive end of the UE 4. The configuration information B may be indicated by using an L2 identifier or an L1 identifier of the UE 4, for example, a source identifier 2, may be indicated by using a link identifier 2 between the UE 1 and the UE 4, or may be indicated by using a connection identifier 2 between the UE 1 and the UE 3. In FIG. 7, the connection identifier 2 indicates the configuration information B. However, in actual application, the DRX configuration information B is indicated by using a source identifier, a link identifier, or a connection identifier. This is not limited.

The receive resource pool of the second communication device may include one or more types, and each receive resource pool corresponds to a CBR of the transmit resource pool. If a current CBR of a receive resource pool of the second communication device is high, a time domain interval of the receive resource pool may be ignored when the first communication device determines the second DRX configuration information. The first communication device determines, based on the configuration information of the receive resource pool, proper SL DRX configuration information between the first communication device and the second communication device, so that active time or active duration (onduration) of the SL DRX configuration information greatly overlaps with time domain of the transmit resource pool. In actual application, one or more pieces of configuration information of transmit resource pools or one or more CBRs of the transmit resource pools may be selected based on a configuration requirement of the first communication device. This is not specifically limited herein.

The first communication device performs SL communication with the second communication device, the first communication device is a transmit end, and the second communication device is a receive end. In actual application, one or more pieces of first information may be selected based on a configuration requirement of the first communication device. This is not specifically limited herein. The first DRX configuration information may include one or more of the following:

Uu DRX configuration information of the second communication device; and fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fifth DRX configuration information.

First SL resource configuration information may include:

configuration information of a receive resource pool of the second communication device, and/or a CBR of the receive resource pool; and configuration information of a transmit resource pool of the second communication device, and/or a CBR of the transmit resource pool.

It should be noted that the following content is similar to a case in which the first communication device performs SL communication with the second communication device, where the first communication device is a receive end, and the second communication device is a transmit end: the configuration information of the receive resource pool of the second communication device, and/or the channel busy rate CBR of the receive resource pool, the Uu DRX configuration information of the second communication device, power level information of the second communication device, the configuration information of the transmit resource pool of the second communication device, and/or the CBR of the transmit resource pool. Details are not described herein again. The following describes only the case in which the first information is the fourth DRX configuration information of the second communication device used as a transmit end and/or a receive end. In a wireless communication system, the second communication device may be used as both a transmit end and a receive end, the fourth DRX configuration information configured between the second communication device and another communication device may be sent to the first communication device. Alternatively, only the fourth DRX configuration information of the second communication device used as a receive end may be sent to the first communication device. Alternatively, only the fourth DRX configuration information of the second communication device used as a transmit end may be sent to the first communication device.

Figure 8:
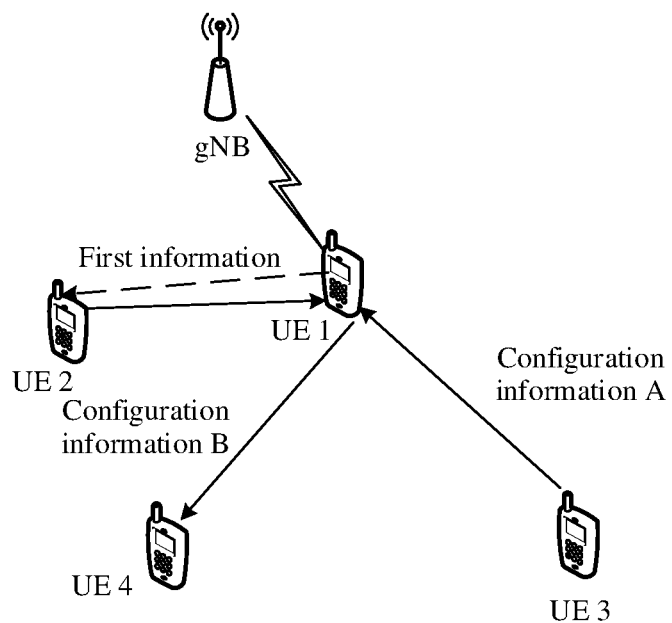
FIG. 8 is a schematic diagram of an application scenario of a communication method according to this application.

Alternatively, the fourth DRX configuration information of second communication devices when some second communication devices are used as transmit ends and some second communication devices are used as transmit ends may be sent. This is not specifically limited in this application. A specific quantity of fourth DRX configuration information to be sent may be determined based on a configuration requirement of the first communication device. As shown in FIG. 8, the first communication device is represented by using UE 2, the second communication device is represented by using UE 1, and UE 3 and UE 4 are used as other communication devices for which the fourth DRX configuration information has been configured between the UE 3/the UE 4 and the UE 1. The fourth DRX configuration information between the UE 1 and the UE 3 is configuration information A, and the UE 1 is used as a receive end of the UE 3. The fourth DRX configuration information between the UE 1 and the UE 4 is configuration information B, and the UE 1 is used as a transmit end of the UE 4. The UE 1 sends the first information to the UE 2, and the first information may include the configuration information A and/or the configuration information B.

The first communication device communicates with the second communication device through a Uu interface, and the first DRX configuration information may include fifth DRX configuration information of the second communication device and/or a third identifier; and the third identifier includes a destination identifier, a source identifier, a link identifier, a connection identifier, a source identifier-destination identifier pair, a resource pool identifier, a configuration authorization identifier, or a service identifier corresponding to the fifth DRX configuration information.

It should be noted that the fifth DRX configuration information of the second communication device is the fifth DRX configuration information that has been configured between the second communication device and another communication device when the second communication device communicates with the another communication device through an SL. The first communication device configures the second DRX configuration information with reference to the fifth DRX configuration information. In this way, active time of the fifth DRX configuration information overlaps with active time of the second DRX configuration information as much as possible, to reduce power consumption of the second communication device. There may be a plurality of pieces of fifth DRX configuration information, and different fifth DRX configuration information corresponds to different third identifiers. The destination identifier indicates a device identifier of a communication device for which the fifth DRX configuration information is configured between the communication device and the second communication device (which may be a destination L1 identifier or a destination L2 identifier). The link identifier indicates a link identifier of a communication device for which the fifth DRX configuration information is configured between the communication device and the second communication device (A destination identifier of the second communication device and a destination identifier of a third communication device correspond to one link identifier, where the third communication device is a communication device for which the fifth DRX configuration information is configured between the third communication device and the second communication device). The third identifier herein is similar to the first identifier in a case in which the first communication device performs SL communication with the second communication device, the first communication device is a receive end, and the second communication device is a transmit end. Details are not described herein again.

Figure 9:
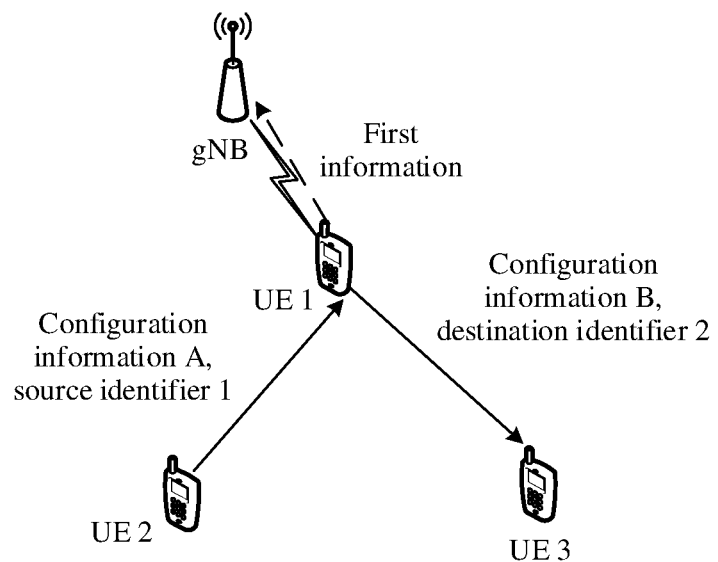
FIG. 9 is a schematic diagram of an application scenario of a communication method according to this application.

As shown in FIG. 9, the first communication device is represented by using a base station, the second communication device is represented by using UE 1, and UE 2 and UE 3 are used as other communication devices for which the fifth DRX configuration information has been configured between the UE 2/the UE 3 and the UE 1. The UE 1 is a receive end relative to the UE 2, and the UE 2 is equivalent to a transmit end of the UE 1. The fifth DRX configuration information between the UE 1 and the UE 2 is configuration information A, and the configuration information A may be indicated by using an L2 identifier or an L1 identifier of the UE 2, for example, a source identifier 1, the configuration information A may be indicated by using a link identifier between the UE 1 and the UE 2, or the configuration information A may be indicated by using a connection identifier 1 between the UE 1 and the UE 2. For example, the source identifier 1 indicates the configuration information A in FIG. 9. However, in actual application, the DRX configuration information A is indicated by using a source identifier, a link identifier, or a connection identifier. This is not limited. The UE 3 is used as a receive end of the UE 1, the UE 1 is used as a transmit end of the UE 3, and the fifth DRX configuration information between the UE 1 and the UE 3 is configuration information B. The configuration information B may be indicated by using a destination identifier 2 of the UE 3, the configuration information B may be indicated by using a link identifier 2 between the UE 1 and the UE 3, or the configuration information B may be indicated by using a connection identifier 2 between the UE 1 and the UE 3. For example, a destination identifier 1 indicates the configuration information B in FIG. 9. However, in actual application, the DRX configuration information B is indicated by using a destination identifier, a link identifier, or a connection identifier. This is not limited.

In addition, it should be noted that if the first communication device (used as a receive end) does not learn of a service period, the first information sent by the second communication device to the first communication device may further include a service period associated with the second DRX configuration information.

In addition, it should be noted that the first information may further include power level information of the second communication device.

When the first communication device configures the second DRX configuration information, the first communication device may further refer to the power level information of the second communication device. If the power level information of the second communication device is low, when the first communication device configures the second DRX configuration information, a power level status of the second communication device is considered, to reduce power consumption of the second communication device as much as possible. If the power level information of the second communication device is high, a power status of the second communication device may be ignored when the second DRX configuration information is configured.

In this application, for different types of second communication devices communicatively connected to the first communication device, the first communication device refers to different first information when the first communication device determines the second DRX configuration information, to reduce a delay and reduce power consumption of the second communication device.

Whether the first communication device communicates with the second communication device through a Uu interface or through an SL communication, and whether the first communication device is used as a receive end or a transmit end, when the first communication device determines the second DRX configuration information with reference to the foregoing first information, in the foregoing step 404, the first communication device determines the second DRX configuration information between the first communication device and the second communication device, and the second DRX configuration information is associated with first information. The second DRX configuration information may be determined in the following manners:

Manner A: The second DRX configuration information is determined based on the first DRX configuration information.

If DRX configuration information is configured between the second communication device and a communication device other than the first communication device, some parameters in the DRX configuration information may be used as reference values of the second DRX configuration information. For example, a value of active time of a configuration parameter of the second DRX configuration information is determined based on active time of a configuration parameter of the first DRX configuration information. If a plurality of sets of DRX configuration information are configured between the second communication device and another communication device, weighted calculation may be performed by using configuration parameters of the DRX configuration information, or the second DRX configuration information may be determined according to a preset calculation rule and a matching rule.

For example, the second communication device performs SL communication with a third communication device, and there are a plurality of sets of SL DRX configuration information configured between the second communication device and the third communication device: configuration information 1, configuration information 2, and configuration information 3. A period of the configuration information 1 is T1, and active time of the configuration information 1 is C1. A period of the configuration information 2 is T2, and active time of the configuration information 2 is C2. A period of the configuration information 3 is T3, and active time of the configuration information 3 is C3.

A period of the second DRX configuration information may be determined with reference to T1, T2, and T3. Alternatively, the period of the second DRX configuration information may be determined with reference to T1, T2, T3, and other factors. The other factors may include a service requirement (a delay, a period, and the like) corresponding to the second DRX configuration information. Active time of the second DRX configuration information may be determined with reference to C1, C2, and C3. Alternatively, the active time of the second DRX configuration information may be determined with reference to C1, C2, C3, and other factors. The other factors may include a service requirement (a delay, a period, and the like) corresponding to the second DRX configuration information. For example, if T1 is 10 milliseconds, T2 is 15 milliseconds, T3 is 15 milliseconds, C1 is 1 to 3 milliseconds, C2 is 1 to 5 milliseconds, and C3 is 8 to 12 milliseconds, when the period of the second DRX configuration information is determined, the service requirement corresponding to the second DRX configuration information may be considered. If the service corresponding to the second DRX configuration information is a service 1, and a delay of the service 1 is 12 milliseconds, the period of the second DRX configuration information may be set to 10 ms, that is, consistent with T1, to reduce power consumption of the first communication device. In addition, when the active time of the second DRX configuration information is set, a time difference between the active time of the second DRX configuration information and the active time of the first DRX configuration information may be as small as possible. For example, the active time of the second DRX configuration information is set to 1 to 4 milliseconds, to better reduce power consumption of the first communication device. For example, if C1 is 1 to 3 milliseconds, and the active time of the second DRX configuration information may be set to 1 to 4 milliseconds, a difference between 1 to 4 milliseconds and 1 to 3 milliseconds is 1 millisecond. This can be understood that a time difference between 1 to 4 milliseconds and 1 to 3 milliseconds is as small as possible. In this application, a time unit is identified by using milliseconds, and in actual application, the time unit may be identified by using a quantity of symbols and a quantity of slots.

For example, the second communication device performs SL communication with a third communication device, the second communication device performs SL communication with a fourth communication device, and there are a plurality of sets of SL DRX configuration information configured between the second communication device and the third communication device: configuration information 1, configuration information 2, and configuration information 3. A period of the configuration information 1 is T1, and active time of the configuration information 1 is C1. A period of the configuration information 2 is T2, and active time of the configuration information 2 is C2. A period of the configuration information 3 is T3, and active time of the configuration information 3 is C3. There are a plurality of sets of SL DRX configuration information configured between the second communication device and the fourth communication device: configuration information 4 and configuration information 5. A period of the configuration information 4 is T4, and active time of the configuration information 4 is C4. A period of the configuration information 5 is T5, and active time of the configuration information 5 is C5. In this case, a period of the second DRX configuration information may be determined with reference to T1, T2, T3, T4, T5, and other factors. The active time of the second DRX configuration information may be determined with reference to C1, C2, C3, C4, C5, and other factors.

For example, the second communication device performs SL communication with a third communication device, the second communication device communicates with a fourth communication device through a Uu interface, and there are a plurality of sets of SL DRX configuration information configured between the second communication device and the third communication device: configuration information 1, configuration information 2, and configuration information 3. A period of the configuration information 1 is T1, and active time of the configuration information 1 is C1. A period of the configuration information 2 is T2, and active time of the configuration information 2 is C2. A period of the configuration information 3 is T3, and active time of the configuration information 3 is C3. Uu DRX configuration information 4 is configured between the second communication device and the fourth communication device, a period of the configuration information 4 is T4, and active time of the configuration information 4 is C4. In this case, the period of the second DRX configuration information may be determined with reference to T1, T2, T3, T4, T5, and other factors. The active time of the second DRX configuration information may be determined with reference to C1, C2, C3, C4, C5, and other factors.

Manner B: The second DRX configuration information is determined based on the first SL resource configuration information.

The first SL resource configuration information indicates an SL resource configuration used for SL communication between the first communication device and the second communication device. A time domain interval of the second DRX configuration information may be determined based on the first SL resource configuration information. For example, the second communication device performs SL communication with a third communication device, the SL resource configuration information may be configuration information of a resource pool and/or a CBR of the resource pool, and the first communication device may determine the time domain interval of the second DRX configuration information with reference to the configuration information of the resource pool and/or the CBR.

Manner C: The second DRX configuration information is determined based on the power level information of the second communication device.

If a power level of the second communication device is greater than a preset threshold, a period of the second DRX configuration information may be set to a small value within a range allowed by a service delay. If a power level of the second communication device is less than a preset threshold, when a period of the second DRX configuration information is set, the period of the second DRX configuration information may be set to a large value within a range allowed by a service delay. When the power level of the second communication device is less than the preset threshold, the period of the second DRX configuration information may be set to a large value. Alternatively, active time of the second DRX configuration information is set to a small value. Alternatively, the period of the second DRX configuration information is set to be a large value, and active time of the second DRX configuration information is set to be short, to reduce device power consumption. C1 and C2 may be specific values, for example, C1 is 10 milliseconds; or C1 and C2 may be a numerical interval, for example, C1 may be a value in an interval range of 10 milliseconds to 15 milliseconds.

Manner D: The second DRX configuration information is determined based on the first DRX configuration information, the first SL resource configuration information, and the power level information of the second communication device.

If the first DRX configuration information is configured between the second communication device and a communication device other than the first communication device, the second communication device performs SL communication with the first communication device, and the first SL resource configuration information is configured between the second communication device and the first communication device, in actual application, the first DRX configuration information, all of the first SL resource configuration information, and the power level information of the second communication device may be used as the first information, so that the first communication device determines the second DRX configuration information by referring to the first information, as described in Manner A, Manner B, and Manner C. For example, the second communication device performs SL communication with a third communication device, SL DRX configuration information 1 is configured between the second communication device and the third communication device, the second communication device communicates with a fourth communication device through a Uu interface, and Uu DRX configuration information 2 is configured between the second communication device and the fourth communication device. In addition, the first SL resource configuration information used when the first communication device communicates with the second communication device is resource configuration information 1. In this case, all of the configuration information 1, the configuration information 2, the resource configuration information 1, and the power level information of the second communication device may be used as the first information, so that the first communication device determines the second DRX configuration information based on the configuration information 1, the configuration information 2, the resource configuration information 1, and other factors.

For example, the second communication device performs SL communication with a third communication device, SL DRX configuration information 1 is configured between the second communication device and the third communication device, the second communication device communicates with a fourth communication device through a Uu interface, and Uu DRX configuration information 2 is configured between the second communication device and the fourth communication device. The first SL resource configuration information is used by the second communication device to send an SL service to the first communication device, and the first SL resource configuration information may include a plurality of resource pool configurations. A period of the configuration information 1 is 10 milliseconds, and active time of the configuration information 1 is 1 to 3 milliseconds. A period of the configuration information 2 is 10 milliseconds, and active time of the configuration information 2 is 1 to 5 milliseconds. The first communication device may set a period of the second DRX configuration information to 10 milliseconds with reference to periods of the configuration information 1 and the configuration information 2, and the first communication device may set active time of the second DRX configuration information to 1 to 5 milliseconds with reference to the active time of the configuration information 1 and the active time of the configuration information 2, to reduce power consumption of the first communication device. Alternatively, a period of the configuration information 1 is 10 milliseconds, and active time of the configuration information 1 is 1 to 3 milliseconds. A period of the configuration information 2 is 15 milliseconds, and active time of the configuration information 2 is 7 to 10 milliseconds. When the first communication device configures the second DRX configuration information, the first communication device may further refer to a service requirement (for example, a delay or a period) delay of 12 milliseconds associated with the second DRX configuration information. In this case, when the first communication device configures the second DRX configuration information, the first communication device may set a period of the second DRX configuration information to 10 milliseconds. In addition, because there is a time domain interval of a resource pool with a low CBR in the first SL resource configuration information, the active time of the second DRX configuration information may be set to 1 to 8 milliseconds.

In addition, priorities may be set for the first DRX configuration information, the first SL resource configuration information, and the power level information of the second communication device, and the second DRX configuration information is sequentially determined based on a priority order. For example, the second communication device performs SL communication with a third communication device, SL DRX configuration information 1 is configured between the second communication device and the third communication device, the second communication device communicates with a fourth communication device through a Uu interface, and Uu DRX configuration information 2 is configured between the second communication device and the fourth communication device. A priority level of the power level information of the second communication device is set to 1 (a highest level). Because there are a large quantity of service interactions between the second communication device and a third communication device, a priority level of the configuration information 1 may be set to 2, and a priority level of the configuration information 2 may be set to 3. The first communication device may determine a configuration parameter of the second DRX configuration information with reference to the priority order. For example, periods of both the configuration information 1 and the configuration information 2 are 10 milliseconds, active time of the configuration information 1 is 1 to 3 milliseconds, active time of the configuration information 2 is 3 to 5 milliseconds, and a power level of the second communication device is lower than a preset threshold, active time of the second DRX configuration information is set to a large value within a range allowed by a service delay, to reduce device power consumption. In addition, because the priority level of the configuration information 1 is high, the active time of the second DRX configuration information may be set to 1 to 4 milliseconds. In this way, power consumption of the communication device can be reduced.

When the second DRX configuration information is determined based on the foregoing manners A to D, or another implementation in which the second DRX configuration information is determined by referring to the first information, other factors of the second DRX configuration information may be further considered. The other factors include a service requirement (a delay, a period, a data rate, and the like) and a resource configuration requirement of the second DRX configuration information. The second DRX configuration information is determined based on manners A to D with reference to the other factors of the second DRX configuration information. In this way, power consumption of the communication device can be reduced.

When the first communication device determines the second DRX configuration information, the first communication device refers to the first information sent by the second communication device, so that when the first communication device determines a configuration parameter of the second DRX configuration information, the first communication device may refer to the first information that has been configured by the second communication device. In this way, some parameters of the second DRX configuration information overlap with some parameters of the first information as much as possible, and power usage of the second communication device is considered as much as possible, to reduce power consumption of the second communication device while meeting a service requirement.

Based on the foregoing description, the first communication device may obtain the first information when the first information changes, and/or a first timer expires or the first timer does not run. This prevents the second communication device from frequently reporting the first information, and avoids a case in which the second communication device does not report the first information when the first information is required.

In addition, when the first communication device performs SL communication with the second communication device, an AS layer of the first communication device indicates the second DRX configuration information to an upper layer. It should be noted that, after the first communication device determines or updates (configures/reconfigures) the second DRX configuration information between the first communication device and the second communication device, the first communication device indicates the second DRX configuration information to the upper layer by using the AS layer. In this way, a memory of the first communication device may be reduced. In addition, the AS layer of the first communication device may further indicate third indication information to the upper layer, where the third indication information includes DRX configuration information between the first communication device and a third communication device. The third communication device also communicates with the first communication device through an SL connection, and there may be a plurality of third communication devices. For example, the first communication device is UE 1, and when the third communication device is UE 2, UE 3, UE 4, and UE 5, DRX configuration information is respectively configured between the UE 1 and the UE 2, between the UE 1 and the UE 3, between the UE 1 and the UE 4, and between the UE 1 and the UE 5. It should be noted that, after the first communication device determines or updates (configures/reconfigures) the DRX configuration information between the first communication device and the third communication device, the first communication device may indicate all the DRX configuration information as the third indication information to the upper layer by using the AS layer, to reduce a memory of the first communication device.

It should be noted that SL DRX configuration information between the first communication device and the second communication device includes a first configuration and a second configuration. The first configuration includes the second DRX configuration information, and the first configuration may be configured in any one of the following two manners:

Manner 1: The first communication device receives the second configuration from the second communication device; and the first communication device sends the first configuration to the second communication device.

Manner 2: The first communication device sends the first configuration to the second communication device; and the first communication device receives the second configuration from the second communication device.

In Manner 1 and Manner 2, configuration parameters of the SL DRX configuration information between the first communication device and the second communication device include a plurality of types, for example, a period, active duration (onduration), a start offset (startoffset), and a retransmission-related timer. It is assumed that the period is a fixed configuration, that is, a period of DRX configuration information configured between the first communication device and any communication device is the same. Therefore, a period does not need to be configured for the first communication device and the second communication device. For example, the first configuration includes at least one configuration parameter of the SL DRX configuration information, and the second configuration includes at least one configuration parameter of the SL DRX configuration information. For example, there are 10 configuration parameters of the SL DRX configuration information, where three configuration parameters are fixed parameter configurations, the first configuration includes five configuration parameters, and the second configuration may include two configuration parameters. Alternatively, the first configuration includes five configuration parameters, the second configuration includes two configuration parameters, and the first configuration and the second configuration are configured in Manner 1, so that a service can be transmitted between the first communication device and the second communication device. In this manner, SL DRX configuration information between the first communication device and the second communication device may be configured, so that configuration consistency can be ensured, and signaling overheads can be reduced.

In addition, in actual application, after the first communication device configures configuration parameters of all SL DRX configuration information between the first communication device and the second communication device, the first communication device sends the configuration parameters to the second communication device. Alternatively, after the second communication device configures configuration parameters of all SL DRX configuration information between the first communication device and the second communication device, the second communication device sends the configuration parameters to the first communication device.

Whether the manner 1 or manner 2 is used to configure the SL DRX configuration information between the first communication device and the second communication device, the purpose is to maintain consistency of the sidelink DRX configuration information between the first communication device and the second communication device, so that configuration consistency can be ensured, and signaling overheads can be reduced.

Embodiment 2

Figure 10:
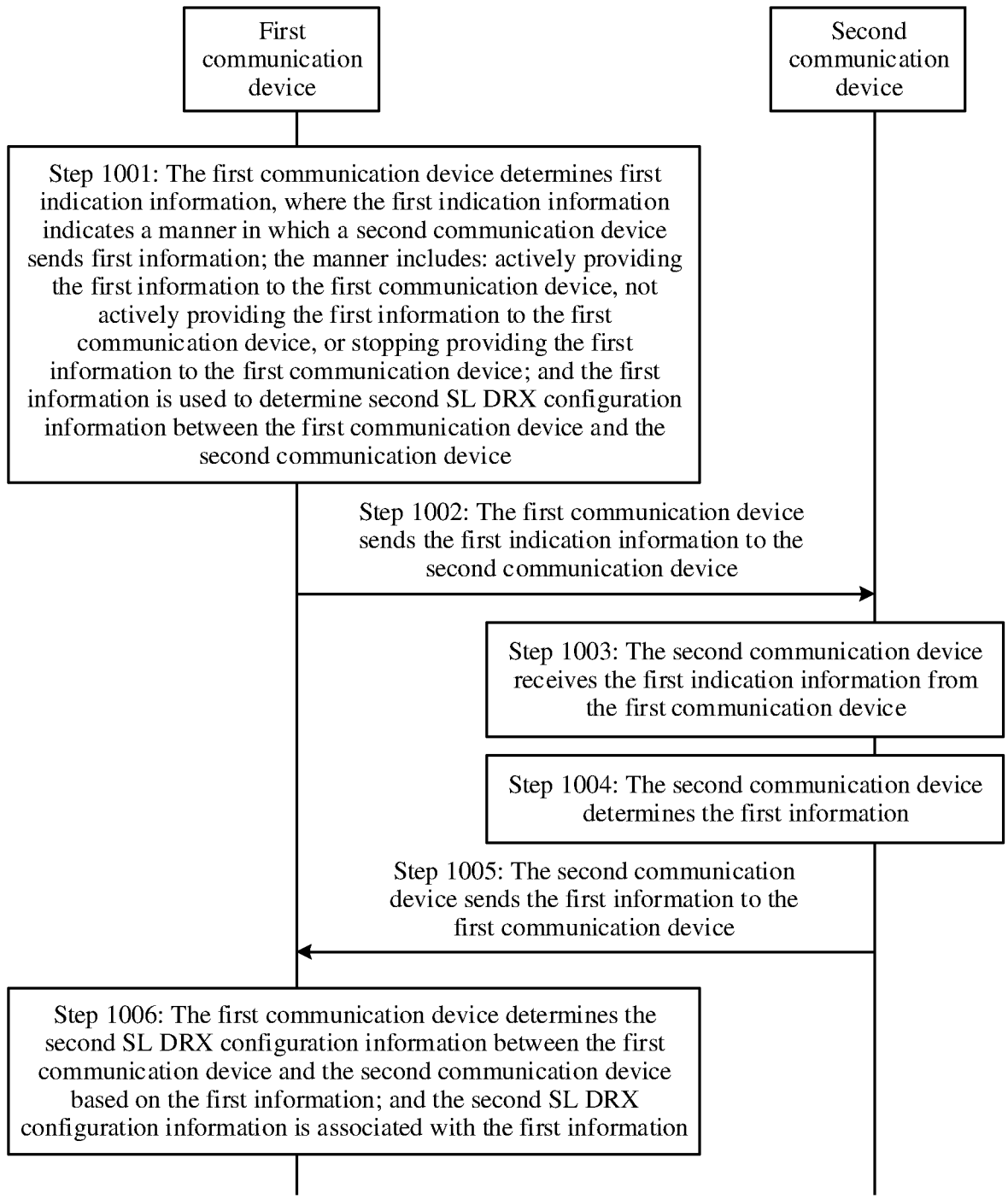
FIG. 10 is a schematic flowchart of a communication method according to this application.

An embodiment of this application further provides a communication method. The communication method may be performed by a first communication device and a second communication device. It should be understood that the first communication device may be a processor or a chip. A form of the first communication device is not specifically limited again. Similarly, the second communication device also has a form the same as that of the first communication device. The communication method provided in this application may be performed with reference to FIG. 10. Details are as follows:

Step 1001: The first communication device determines first indication information, where the first indication information indicates a manner in which the second communication device sends first information; the manner includes: actively providing the first information to the first communication device, not actively providing the first information to the first communication device, or stopping providing the first information to the first communication device; and the first information is used to determine second SL DRX configuration information between the first communication device and the second communication device.

Step 1002: The first communication device sends the first indication information to the second communication device.

Step 1003: The second communication device receives the first indication information from the first communication device.

Step 1004: The second communication device determines the first information.

Step 1005: The second communication device sends the first information to the first communication device.

Step 1006: The first communication device determines the second SL DRX configuration information between the first communication device and the second communication device based on the first information, and the second SL DRX configuration information is associated with the first information.

The first communication device may periodically send the first indication information to the second communication device, may send the first indication information within specified time, or may send the first indication information in an event-triggered manner. A trigger occasion for sending the first indication information is not limited in this application. The second communication device may learn, based on the first indication information, whether to actively provide the first information, not actively provide the first information, or stop providing the first information to the first communication device. In addition, signaling or signals used in different manners may be different or the same. This is not specifically limited herein. For example, the second communication device actively provides the first information by using first signaling, does not actively provide the first information by using second signaling, or stops providing the first information by using third signaling. Alternatively, the second communication device actively provides, does not actively provide, and stops providing the first information by using the first signaling.

In addition, after the second communication device receives the first indication information, the second communication device may immediately report the first information, or may report the first information at specified time or periodically report the first information according to a rule specified by the second communication device. In this application, a manner of reporting the first information may be flexibly controlled by using the first indication information. For example, when SLDrxAssitanceInfo (included in the first indication information) received by the second communication device is set to setup, it indicates that the second communication device is configured to actively provide the first information to the first communication device. On the contrary, if SLDrxAssitanceInfo is set to release, it indicates that the second communication device is configured not to actively provide the first information to the first communication device.

For example, it is noted that the first information includes first discontinuous reception DRX configuration information and/or first sidelink SL resource configuration information from the second communication device. The first DRX configuration information is associated with the second communication device, and the first SL resource configuration information is associated with the second communication device.

It should be noted that the first information may be information associated between the second communication device and another communication device other than the first communication device. When SL communication is performed between any two communication devices, DRX configuration information configured between the two communication devices is SL DRX configuration information. When any two communication devices communicate with each other through a Uu interface, DRX configuration information configured between the two communication devices is Uu DRX configuration information. In addition, it should be noted that the first SL DRX configuration information is DRX configuration information configured when the second communication device performs SL communication with a communication device other than the first communication device. The first SL DRX configuration information may be DRX configuration information corresponding to an SL connection, a connection identifier of an SL link, a link identifier, or (source L2/L1 ID, destination L2/L1 ID) between the second communication device and the communication device other than the first communication device. Alternatively, the first SL DRX configuration information may be an SL connection corresponding to an L2/L1 ID of the second communication device and an L2/L1 ID of a communication device other than the L2/L1 ID of the first communication device, or DRX configuration information corresponding to an SL link. The L2/L1 ID may be a source L2/L1 ID, or may be a destination L2/L1 ID. First Uu DRX configuration information is DRX configuration information configured when the second communication device communicates with a communication device other than the first communication device through the Uu interface.

In a possible implementation, the first indication information is carried in a radio resource control RRC message, a media access control MAC control element CE, or side link control information SCI.

In addition, when the first communication device performs SL communication with the second communication device, a delay generated when the first indication information is carried in the PC5 RRC message is large, a delay generated when the first indication information is carried in the SCI is small, and a delay generated when the first indication information is carried in the MAC CE is smaller than the delay generated when the first indication information is carried in the PC5 RRC message, and is larger than the delay generated when the first indication information is carried in the SCI. In addition, the PC5 RRC message may be a PC5 RRC reconfiguration message. The first communication device may send the first indication information to the second communication device, so that the second communication device learns how to report the first information.

In addition, it should be further noted that the first information mentioned in Embodiment 2 is not limited to the first information included in Embodiment 1, and may also be applicable to a case in which the first information includes other information. Details are not described herein.

Embodiment 3

Figure 11:
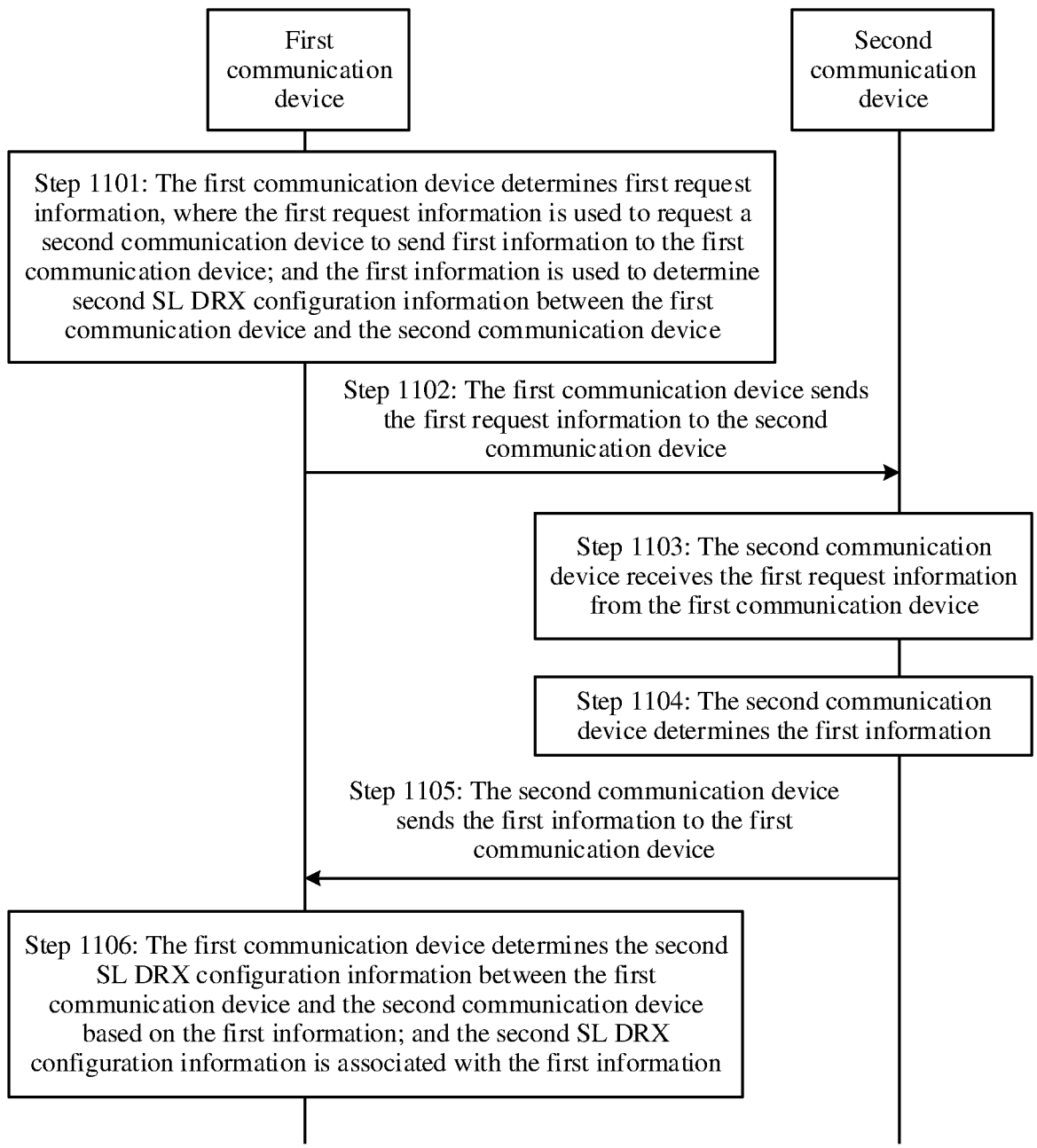
FIG. 11 is a schematic flowchart of a communication method according to this application.

An embodiment of this application further provides a communication method. The communication method may be performed by a first communication device and a second communication device. It should be understood that the first communication device may be a processor or a chip. A form of the first communication device is not specifically limited again. Similarly, the second communication device also has a form the same as that of the first communication device. The communication method provided in this application may be performed with reference to FIG. 11. Details are as follows:

Step 1101: The first communication device determines first request information, where the first request information is used to request the second communication device to send first information to the first communication device; and the first information is used to determine second SL DRX configuration information between the first communication device and the second communication device.

Step 1102: The first communication device sends the first request information to the second communication device.

Step 1103: The second communication device receives the first request information from the first communication device.

Step 1104: The second communication device determines the first information.

Step 1105: The second communication device sends the first information to the first communication device.

Step 1106: The first communication device determines the second SL DRX configuration information between the first communication device and the second communication device based on the first information; and the second SL DRX configuration information is associated with the first information.

The first communication device sends the first request information to the second communication device. After the second communication device receives the first request information, the second communication device may immediately report the first information, or may report the first information at specified time or periodically report the first information according to a rule specified by the second communication device. In this application, signaling overheads can be reduced by using the first request information, and the first communication device sends the first request information only when the first communication device has a requirement.

In addition, the first request information includes a request reason. When the first communication device performs SL communication with the second communication device, the request reason may include that the first communication device needs to configure the second SL DRX configuration information, and/or the first communication device needs to configure second SL resource configuration information. When the first communication device communicates with the second communication device through a Uu interface, the request reason may include that the first communication device needs to configure the second SL DRX configuration information, the first communication device needs to configure the Uu DRX configuration information, and/or the first communication device needs to configure second SL resource configuration information. In this way, signaling overheads for sending the first information may be reduced.

In addition, for different types of first communication devices or second communication devices, information indicated by the first request information is different. If the first communication device performs SL communication with the second communication device, the first request information may indicate one or more of the following information: The first communication device needs to configure the second SL DRX configuration information, and the first communication device needs to configure the second SL resource configuration information. The first communication device notifies, by using the first request information, the second communication device of a reason why the first information needs to be reported, that is, the first communication device needs to configure the second SL DRX configuration information and/or the second SL resource configuration information, so that the second communication device reports the first information.

In addition, when the first communication device performs SL communication with the second communication device, and it is determined that the first communication device meets the following preset condition, the first communication device sends the first request information to the second communication device, where the preset condition includes the following.

Condition 1: An AS layer of the first communication device triggers configuration of the second SL DRX configuration information or the second SL resource configuration information.

Condition 2: An upper layer of the first communication device triggers configuration of the second SL DRX configuration information or the second SL resource configuration information, where the upper layer includes an application layer and/or a V2X layer.

It should be noted that, when it is determined herein that the first communication device meets the preset condition, it is not limited that the first communication device definitely needs to perform an action of determining whether the preset condition is met. It may also be understood that when the first communication device meets the preset condition, the first communication device sends the first request information to the second communication device. In addition, in this application, the first communication device sends the first request information only when the first communication device meets the preset condition, so that service scheduling of the first communication device is adapted to the second SL DRX configuration information, to reduce memory occupation as much as possible.

It should be further noted that the second communication device may send second indication information to the first communication device, so that the first communication device may request the first information from the second communication device. The first communication device may send the first request information to the second communication device after the first communication device receives the second indication information from the second communication device.

Before the first communication device obtains the first information, the first communication device sends information to the second communication device in the manner 1 or manner 2, so that the second communication device learns when or how to provide the first information to the first communication device.

In addition, for the first communication device and the second communication device, if different communication connection manners are used between the first communication device and the second communication device, signaling used by the first communication device to carry the first indication information or the first request information is also different. If the first communication device performs SL communication with the second communication device, the first indication information or the first request information may be carried in PC5 RRC information, a MAC CE, or SCI. If the first communication device and the second communication device are communicatively connected through a Uu interface, the first indication information or the first request information may be carried in Uu RRC information, a MAC CE, or DCI.

In a possible implementation, second indication information is received from the second communication device, where the second indication information indicates the first communication device to request the second communication device to provide the first information.

In a possible implementation, the second SL DRX configuration information between the first communication device and the second communication device is determined, and the second SL DRX configuration information is associated with the first information.

In addition, it should be further noted that the first information mentioned in Embodiment 3 is not limited to the first information included in Embodiment 1, and may also be applicable to a case in which the first information includes other information. Details are not described herein.

Embodiment 4

Figure 12:
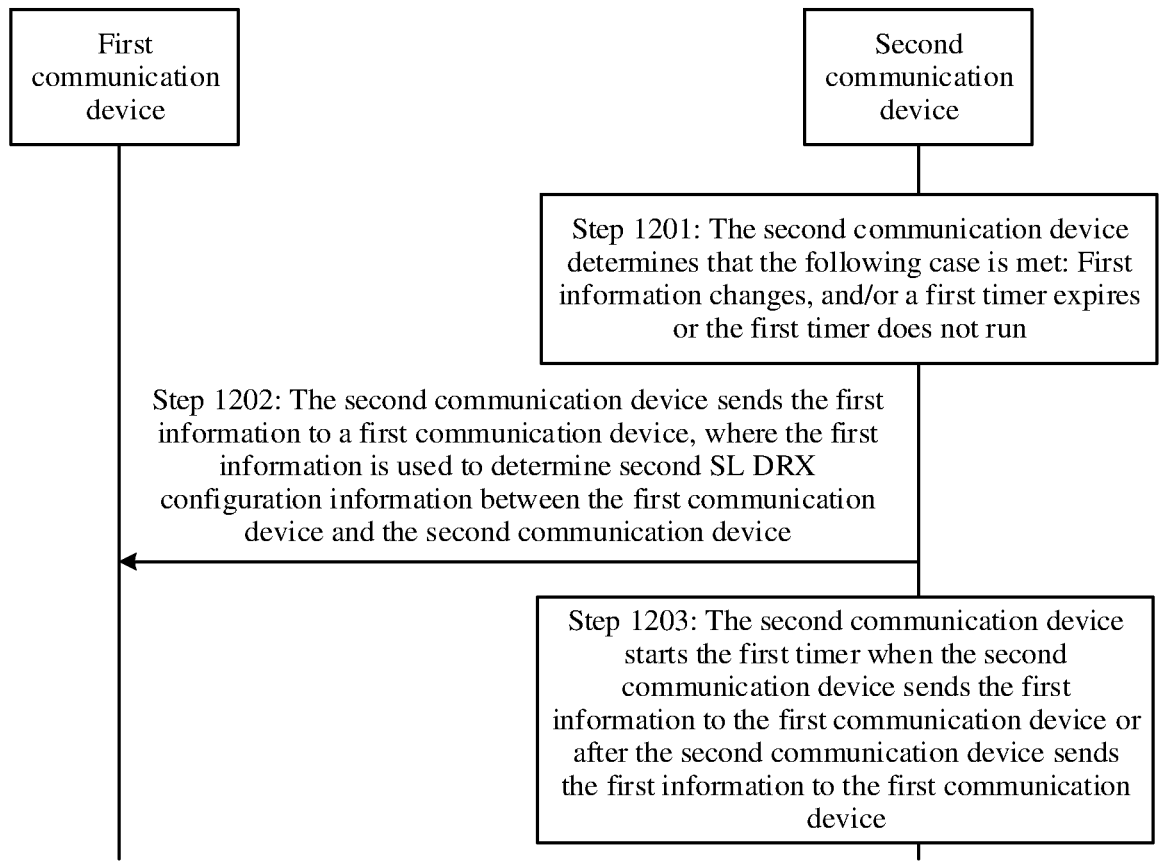
FIG. 12 is a schematic flowchart of a communication method according to this application.

An embodiment of this application further provides a communication method. The communication method may be performed by a second communication device. It should be understood that the second communication device may be a processor or a chip. The communication method provided in this application may be performed with reference to FIG. 12. Details are as follows:

Step 1201: The second communication device determines that the following case is met: First information changes; and/or a first timer expires or the first timer does not run.

Step 1202: The second communication device sends the first information to a first communication device, where the first information is used to determine second SL DRX configuration information between the first communication device and the second communication device.

Step 1203: The second communication device starts the first timer when the second communication device sends the first information to the first communication device or after the second communication device sends the first information to the first communication device.

It should be noted that a change of the first information refers to a parameter update in the first information, for example, a parameter increase, a parameter decrease, or a parameter value change. The parameter increase may be understood as that a quantity of parameters or a type of parameters in the first information increases. The parameter decrease may be understood as that a quantity of parameters or a type of parameters in the first information decreases. The parameter value change may be understood as that a value of a parameter in the first information changes, or may be understood as that a change amplitude of a value of a parameter in the first information exceeds a preset threshold or is lower than a preset threshold.

This avoids a case in which the second communication device frequently reports the first information, and avoids a case in which the second communication device does not report the first information when the first communication device needs the first information.

In addition, it should be further noted that the first information mentioned in Embodiment 4 is not limited to the first information included in Embodiment 1, and may also be applicable to a case in which the first information includes other information. Details are not described herein.

Figure 13:
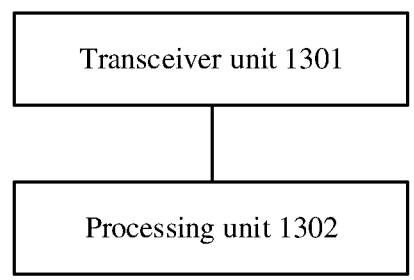
FIG. 13 is a schematic diagram of a structure of a communication apparatus according to this application.

Based on a same technical idea, an embodiment of this application further provides a communication apparatus. As shown in FIG. 13, the communication apparatus includes a transceiver unit 1301 and a processing unit 1302. The communication apparatus may be used as the first communication device in the foregoing method embodiment, and perform steps performed by the first communication device.

The transceiver unit 1301 is configured to obtain first information, where the first information includes first DRX configuration information and/or first SL resource configuration information from a second communication device. The processing unit 1302 is configured to determine second DRX configuration information between the first communication device and the second communication device, where the second DRX configuration information is associated with the first information.

In a possible implementation, the first DRX configuration information includes first SL DRX configuration information and/or Uu DRX configuration information.

In a possible implementation, the first DRX configuration information does not include the second DRX configuration information.

In a possible implementation, the processing unit 1302 is further configured to: send first indication information to the second communication device, where the first indication information indicates a manner in which the second communication device sends the first information; and the manner includes: actively providing the first information to the first communication device, not actively providing the first information to the first communication device, or stopping providing the first information to the first communication device.

In a possible implementation, the processing unit 1302 is further configured to receive second indication information from the second communication device, where the second indication information indicates the first communication device to request the second communication device to provide the first information.

In a possible implementation, the first communication device performs SL communication with the second communication device, and the first indication information is carried in a PC5 RRC message, a MAC CE, or SCI.

In a possible implementation, the first communication device communicates with the second communication device through a Uu interface, and the first indication information is carried in a Uu RRC message, a MAC CE, or DCI.

In a possible implementation, the processing unit 1302 is further configured to: send first request information to the second communication device, where the first request information is used to request the second communication device to send the first information to the first communication device.

In a possible implementation, the first request information includes a request reason; and the request reason may include one or more of the following information: configuring the second DRX configuration information, configuring the Uu DRX configuration information, and configuring second SL resource configuration information.

In a possible implementation, the first communication device performs SL communication with the second communication device; and the first request information indicates one or more of the following information: configuring the second DRX configuration information and configuring second SL resource configuration information.

In a possible implementation, the first communication device communicates with the second communication device through a Uu interface, and the first request information includes one or more of the following information: configuring the Uu DRX information, configuring the second DRX configuration information, and configuring second SL resource information.

In a possible implementation, it is determined that a preset condition is met, and the first communication device sends the first request information to the second communication device, where the preset condition includes:
An access stratum AS layer of the first communication device triggers configuration of the second DRX configuration information or the second SL resource configuration information; or
an upper layer of the first communication device triggers configuration of the second DRX information or the second SL resource configuration information, where the upper layer includes an application layer and/or a V2X layer.

In a possible implementation, the first communication device performs SL communication with the second communication device, and the first communication device is a receive end; and the first DRX configuration information includes one or more of the following:
Uu DRX configuration information of the second communication device; and
third DRX configuration information of the second communication device used as a receive end, and/or a first identifier; and the first identifier includes a source identifier (ID), a link identifier (ID), a connection identifier (ID), a resource pool identifier, a configuration authorization identifier, or a service identifier corresponding to the third DRX configuration information.

First SL resource configuration information includes:
configuration information of a transmit resource pool of the second communication device, and/or a channel busy rate (CBR) of the transmit resource pool.

In a possible implementation, the first communication device performs SL communication with the second communication device, and the first communication device is a transmit end; and the first DRX configuration information includes one or more of the following:
Uu DRX configuration information of the second communication device; and
fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.

First SL resource configuration information includes:
configuration information of a receive resource pool of the second communication device, and/or a CBR of the receive resource pool.

In a possible implementation, the first communication device communicates with the second communication device through a Uu interface; and the first DRX configuration information includes:
fifth DRX configuration information of the second communication device and/or a third identifier; and the third identifier includes a destination identifier (ID), a source identifier, a link identifier, a connection identifier, a source identifier-destination identifier pair, a resource pool identifier, a configuration authorization identifier, or a service identifier corresponding to the fifth DRX configuration information.

In a possible implementation, the first information further includes:
power level information of the second communication device.

In a possible implementation, the processing unit 1302 obtains the first information in the following cases:
the first information changes; and/or
a first timer expires or the first timer does not run.

In a possible implementation, the processing unit 1302 is further configured to: receive the first information from the second communication device, and start the first timer.

In a possible implementation, the first communication device performs SL communication with the second communication device; and the processing unit 1302 is further configured to:
indicate the second DRX configuration information to the upper layer by using the AS layer, where the upper layer includes the application layer and/or the V2X layer.

In a possible implementation, the processing unit 1302 is further configured to:
indicate third indication information to the upper layer by using the AS layer, where the third indication information includes DRX configuration information between the first communication device and a third communication device.

In a possible implementation, SL DRX configuration information between the first communication device and the second communication device includes a first configuration and a second configuration; the first configuration includes the second DRX configuration information; and the processing unit 1302 is further configured to:

receive the second configuration from the second communication device; and send the first configuration to the second communication device.

In a possible implementation, SL DRX configuration information between the first communication device and the second communication device includes a first configuration and a second configuration; the first configuration includes the second DRX configuration information; and the processing unit 1302 is further configured to:

send the first configuration to the second communication device; and receive the second configuration from the second communication device.

In a possible implementation, the first configuration includes at least one configuration parameter of the SL DRX configuration information; and the second configuration includes at least one configuration parameter of the SL DRX configuration information.

Figure 14:
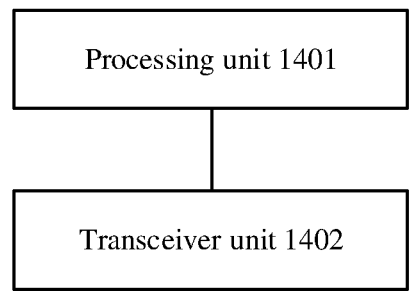
FIG. 14 is a schematic diagram of a structure of another communication apparatus according to this application.

Based on a same technical idea, an embodiment of this application further provides a communication apparatus. As shown in FIG. 14, the communication apparatus includes a processing unit 1401 and a transceiver unit 1402. The communication apparatus may be used as the second communication device in the foregoing method embodiment, and perform steps performed by the second communication device.

The processing unit 1401 is configured to determine first information; the first information includes first DRX configuration information and/or first sidelink SL resource configuration information; and the first information is associated with the second communication device. The transceiver unit 1402 is configured to send the first information to a first communication device so that the first communication device determines second DRX configuration information based on the first information.

In a possible implementation, the processing unit 1401 is further configured to: receive the second DRX configuration information from the first communication device; the second DRX configuration information is DRX configuration information between the first communication device and the second communication device; and the second DRX configuration information is associated with the first information.

In a possible implementation, the first DRX configuration information includes first SL DRX configuration information and/or Uu DRX configuration information.

In a possible implementation, the first DRX configuration information does not include the second DRX configuration information.

In a possible implementation, the processing unit 1401 is further configured to:

receive first indication information from the first communication device, where the first indication information indicates a manner in which the second communication device sends the first information; and the manner includes: actively providing the first information to the first communication device, not actively providing the first information to the first communication device, or stopping providing the first information to the first communication device.

In a possible implementation, the processing unit 1401 is further configured to send second indication information to the first communication device, where the second indication information indicates the first communication device to request the second communication device to provide the first information.

In a possible implementation, the first communication device performs SL communication with the second communication device, and the second indication information is carried in a PC5 RRC message, a MAC CE, or SCI.

In a possible implementation, the first communication device communicates with the second communication device through a Uu interface, and the first indication information is carried in a Uu RRC message, a MAC CE, or DCI.

In a possible implementation, the processing unit 1401 is further configured to:

receive first request information from the first communication device, where the first request information is used to request the second communication device to send the first information to the first communication device.

In a possible implementation, the first request information includes a request reason; and the request reason may include one or more of the following information: configuring the second DRX configuration information, configuring the Uu DRX configuration information, and configuring second SL resource configuration information.

In a possible implementation, the first communication device performs SL communication with the second communication device; and the first indication information indicates one or more of the following information: configuring the second DRX configuration information and configuring second SL resource configuration information.

In a possible implementation, the first communication device communicates with the second communication device through a Uu interface, and the first indication information indicates one or more of the following information: configuring the Uu DRX information, configuring the second DRX configuration information, and configuring the second SL resource information.

In a possible implementation, the second communication device performs SL communication with the first communication device, and the second communication device is a transmit end; and the first DRX configuration information includes one or more of the following:

Uu DRX configuration information of the second communication device; and third DRX configuration information of the second communication device used as a receive end, and/or a first identifier; and the first identifier includes a source identifier, a link identifier, a connection identifier, a resource pool identifier, a configuration authorization identifier, or a service identifier corresponding to the third DRX configuration information.

First SL resource configuration information includes:

configuration information of a transmit resource pool of the second communication device, and/or a channel busy rate CBR of the transmit resource pool.

In a possible implementation, the second communication device performs SL communication with the first communication device, and the second communication device is a receive end; and the first DRX configuration information includes one or more of the following:

Uu DRX configuration information of the second communication device; and fourth DRX configuration information of the second communication device used as a transmit end and/or a receive end, and/or a second identifier; and the second identifier includes a destination identifier, a source identifier, a link identifier, a connection identifier, a source identifier-destination identifier pair, a resource pool identifier, a configuration authorization identifier, or a service identifier corresponding to the fourth DRX configuration information.

First SL resource configuration information includes:
configuration information of a receive resource pool of the second communication device, and/or a CBR of the receive resource pool.

In a possible implementation, the second communication device communicates with the first communication device through a Uu interface; and the first DRX configuration information includes one or more of the following:
fifth DRX configuration information of the second communication device and/or a third identifier; and the third identifier includes a destination identifier, a source identifier, a link identifier, a connection identifier, a source identifier-destination identifier pair, a resource pool identifier, a configuration authorization identifier, or a service identifier corresponding to the fifth DRX configuration information.

In a possible implementation, the first information further includes:
power level information of the second communication device.

In a possible implementation, the processing unit 1401 sends the first information in the following cases:
the first information changes; and/or
a first timer expires or the first timer does not run.

In a possible implementation, the processing unit 1401 is further configured to start the first timer when the transceiver unit 1402 sends the first information to the first communication device or after the transceiver unit 1402 sends the first information to the first communication device.

In a possible implementation, the second communication device performs SL communication with the first communication device; the processing unit 1401 is further configured to indicate the second DRX configuration information to the upper layer by using the AS layer of the second communication device; and the upper layer includes an application layer and/or a V2X layer.

In a possible implementation, the processing unit 1401 is further configured to: indicate third indication information to the upper layer by using the AS layer of the second communication device, where the third indication information includes DRX configuration information between the second communication device and a third communication device.

In a possible implementation, SL DRX configuration information between the second communication device and the first communication device includes a first configuration and a second configuration; the first configuration includes the second DRX configuration information; and the processing unit 1401 is further configured to: send the second configuration to the first communication device; and receive the first configuration from the second communication device.

In a possible implementation, SL DRX configuration information between the second communication device and the first communication device includes a first configuration and a second configuration; the first configuration includes the second DRX configuration information; and the processing unit 1401 is further configured to: receive the first configuration from the first communication device; and send the second configuration to the first communication device.

In a possible implementation, the first configuration includes at least one configuration parameter of the SL DRX configuration information; and the second configuration includes at least one configuration parameter of the SL DRX configuration information.

Figure 15:
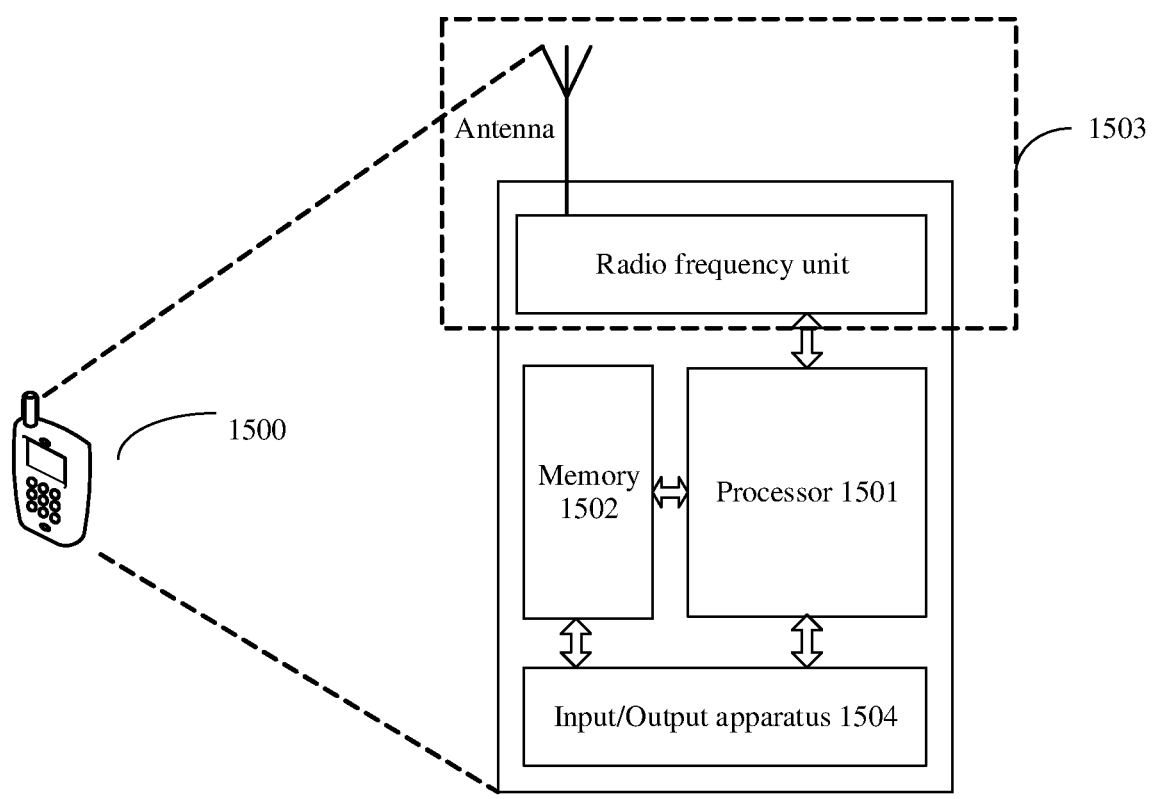
FIG. 15 is a schematic diagram of a structure of another communication apparatus according to this application.

In another possible implementation, the communication apparatus provided in this embodiment of this application may alternatively include a hardware component, for example, a processor, a memory, or a transceiver. For ease of understanding and illustration, in FIG. 15, a mobile phone is used as an example to describe possible structures of the first communication device and/or the second communication device. As shown in FIG. 15, a communication device 1500 may include a processor 1501, a memory 1502, and a transceiver 1503.

The processor 1501 may be configured to: process a communication protocol and communication data, control the first communication device and/or the second communication device, execute a software program, process data of the software program, and the like. The memory 1502 may be configured to store a program and data. The processor 1501 may perform, based on the program, the method performed by the first communication device and/or the second communication device in embodiments of this application.

The transceiver 1503 may include a radio frequency unit and an antenna. The radio frequency unit may be configured to: perform conversion between a baseband signal and a radio frequency signal, and process the radio frequency signal. The antenna may be configured to receive and send a radio frequency signal in a form of an electromagnetic wave. In addition, only the radio frequency unit may be considered as the transceiver 1503. In this case, the communication apparatus 1500 may include the processor 1501, the memory 1502, the transceiver 1503, and an antenna.

In addition, the communication apparatus 1500 may further include an input/output apparatus 1504, for example, a component that can be configured to receive data entered by a user and output data to the user, such as a touchscreen, a display screen, or a keyboard. It should be noted that some types of communication apparatuses may have no input/output apparatus.

Based on the structure shown in FIG. 15, when the communication apparatus 1500 needs to send data, the processor 1501 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives the radio frequency signal through the antenna, converts the radio frequency signal into a baseband signal, and outputs the baseband signal to the processor 1501. The processor 1501 converts the baseband signal into data and processes the data.

When implementing a function performed by the first communication device in the first embodiment provided in this embodiment of this application, the transceiver 1503 may be configured to: receive first information, and send second DRX configuration information to a second communication device. The first information includes first DRX configuration information and/or first SL resource configuration information from the second communication device; and the first information is associated with the second communication device.

When implementing a function performed by the second communication device in the first embodiment provided in this embodiment of this application, the transceiver 1503 may be configured to: send the first information to the first communication device, and receive the second DRX configuration information sent by the first communication device. The first information includes first DRX configuration information and/or first SL resource configuration information; and the first information is associated with the second communication device.

In addition, based on an actual use requirement, the communication apparatus provided in embodiments of this application may include a processor, and the processor invokes an external transceiver and/or memory to implement the foregoing functions, steps, or operations. The communication apparatus may further include a memory, and the processor invokes and executes a program stored in the memory, to implement the foregoing functions, steps, or operations. Alternatively, the communication apparatus may include a processor, namely, a transceiver, and the processor invokes and executes a program stored in an external memory, to implement the foregoing functions, steps, or operations. Alternatively, the communication apparatus may include a processor, a memory, and a transceiver.

Figure 16:
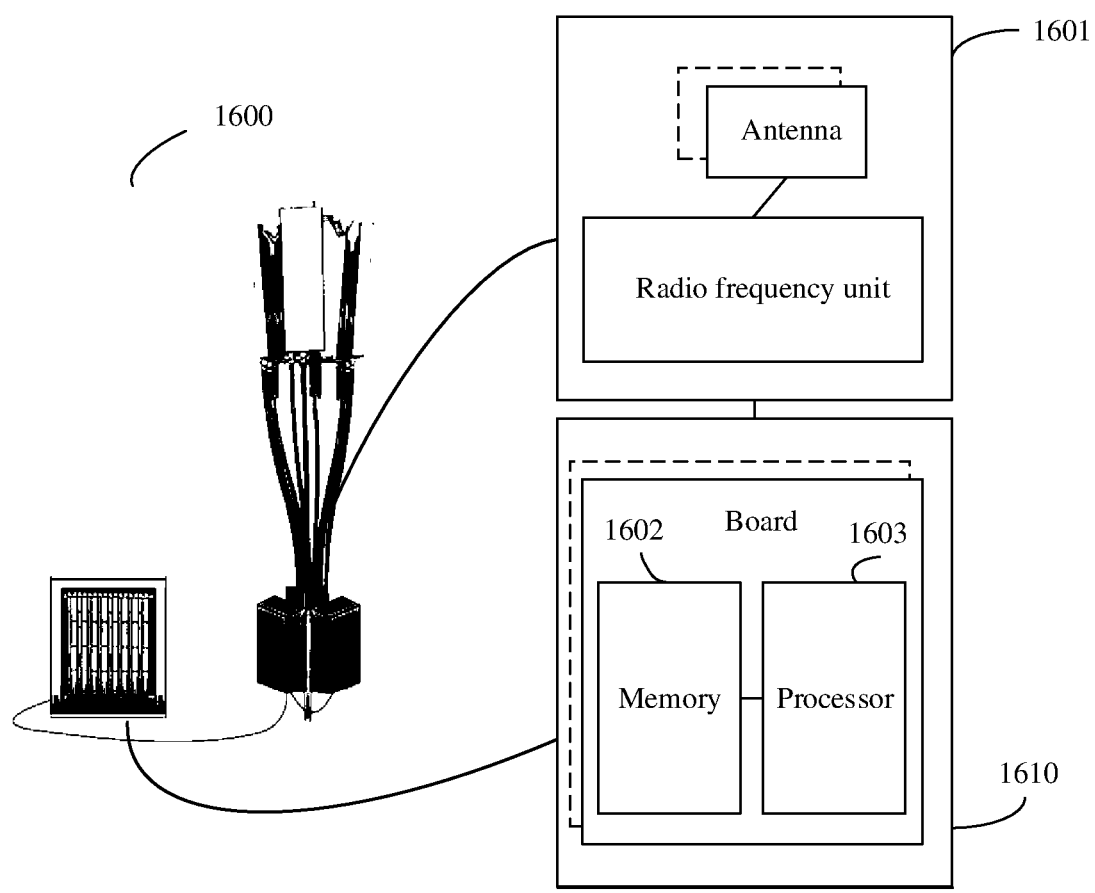
FIG. 16 is a schematic diagram of a structure of another communication apparatus according to this application.

For ease of understanding, a structure of the communication apparatus is described by using a base station as an example in FIG. 16. As shown in FIG. 16, a communication apparatus 1600 may include a transceiver 1601, a memory 1602, and a processor 1603, to implement functions of a network device, a third communication device, and/or a fourth communication device provided in embodiments of this application. The transceiver 1601 may be used by the communication apparatus to perform communication. The memory 1602 is coupled to the processor 1603, and may be configured to store a program and data that are necessary for the communication apparatus 1600 to implement various functions. The processor 1603 is configured to support the communication apparatus 1600 in performing a function corresponding to a function of the network device, the third communication device, and/or the fourth communication device in the foregoing method. The function may be implemented by invoking a program stored in the memory 1602.

Specifically, the transceiver 1601 may be a wireless transceiver, and may be configured to support the communication apparatus 1600 in receiving and sending signaling and/or data by using a wireless air interface. The transceiver 1601 may also be referred to as a transceiver unit or a communication unit. The transceiver 1601 may include a radio frequency unit and one or more antennas. The radio frequency unit, for example, a remote radio unit (RRU) may be specifically configured to: transmit a radio frequency signal and convert a radio frequency signal and a baseband signal. The one or more antennas may be specifically configured to radiate and receive a radio frequency signal. Optionally, the transceiver 1601 may include only the foregoing radio frequency unit. In this case, the communication apparatus 1600 may include a transceiver 1601, a memory 1602, a processor 1603, and an antenna.

The memory 1602 and the processor 1603 may be integrated or independent of each other. As shown in FIG. 16, the memory 1602 and the processor 1603 may be integrated into a control unit 1610 of the communication apparatus 1600. For example, the control unit 1610 may include a baseband unit (BBU) of an LTE base station, and the baseband unit may also be referred to as a digital unit (DU), or The control unit 1610 may include a distributed unit (DU) and/or a central unit (CU) in a base station in 5G and future radio access technologies. The control unit 1610 may be formed by one or more boards. A plurality of boards may jointly support a radio access network (such as an LTE network) of a single access standard, and the plurality of boards may also support radio access networks of different access standards (such as LTE, 5G, or other networks). The memory 1602 and the processor 1603 may serve one or more boards. In other words, the memory 1602 and the processor 1603 may be separately disposed on each board. Alternatively, a plurality of boards may share the same memory 1602 and the same processor 1603. In addition, a necessary circuit may be disposed on each board. For example, the circuit may be configured to implement coupling between the memory 1602 and the processor 1603. The transceiver 1601, the processor 1603, and the memory 1602 may be connected by using a bus structure and/or another connection medium.

Based on the structure shown in FIG. 16, when the communication apparatus 1600 needs to send data, the processor 1603 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1600, the radio frequency unit receives the radio frequency signal through the antenna, converts the radio frequency signal into a baseband signal, and outputs the baseband signal to the processor 1603, and the processor 1603 converts the baseband signal into data and processes the data.

Based on a same idea as the foregoing method embodiments, an embodiment of this application further provides a computer-readable storage medium. The computer-readable storage medium stores program instructions (or referred to as a computer program or instructions). When the program instructions are executed by a processor, the computer is enabled to perform operations performed by the first communication device and the second communication device in any one of the foregoing method embodiments and possible implementations of the method embodiments.

Based on a same idea as the foregoing method embodiments, this application further provides a computer program product, including program instructions. When the computer program product is invoked and executed by a computer, the computer may be enabled to implement operations performed by the first communication device and the second communication device in any one of the foregoing method embodiments and possible implementations of the method embodiments.

Based on a same idea as the foregoing method embodiments, this application further provides a chip or a chip system. The chip is coupled to a transceiver, and is configured to implement operations performed by the first communication device and the second communication device in any one of the foregoing method embodiments and the possible implementations of the method embodiments. The chip system may include the chip and components such as a memory and a communication interface.

Based on a same idea as the foregoing method embodiments, this application further provides a communication system. The communication system may be configured to implement operations performed by the first communication device and the second communication device in any one of the foregoing method embodiments and the possible implementations of the method embodiments. For example, the communication system has a structure shown in FIG. 1.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method applied to a second communication device or a chip of the second communication device, comprising:
   determining first information, wherein the first information comprises at least one of first discontinuous reception (DRX) configuration information or first sidelink (SL) resource configuration information, and wherein the first information is associated with the second communication device;
   sending, to a first communication device, the first information, the first information used for determining second DRX configuration information based on the first information; and
   receiving, from the first communication device, the second DRX configuration information, wherein the second DRX configuration information is between the first communication device and the second communication device, and wherein the second DRX configuration information is associated with the first information.

2. The method according to claim 1, wherein the first DRX configuration information comprises at least one of first SL DRX configuration information or Uu DRX configuration information.

3. The method according to claim 1, wherein the first DRX configuration information does not comprise the second DRX configuration information.

4. The method according to claim 1, wherein the method further comprises:
   receiving, from the first communication device, first indication information, wherein the first indication information indicates a manner in which the second communication device sends the first information, and wherein the manner comprises:
   actively providing the first information to the first communication device,
   not actively providing the first information to the first communication device, or
   stopping providing the first information to the first communication device.

5. The method according to claim 1, wherein the method further comprises:
   receiving, from the first communication device, first request information, wherein the first request information requests the second communication device to send the first information to the first communication device.

6. The method according to claim 1, wherein the second communication device communicates with the first communication device through a Uu interface, and the first DRX configuration information comprises one or more of:
   fifth DRX configuration information of the second communication device or a third identifier,
   wherein the third identifier comprises a destination identifier, a source identifier, a link identifier, a connection identifier, a source identifier-destination identifier pair, a resource pool identifier, a configuration authorization identifier, or a service identifier corresponding to the fifth DRX configuration information.

7. The method according to claim 1, wherein the second communication device sends the first information based on at least one of:
   that the first information changes, or
   that a first timer expires or the first timer does not run.

8. The method according to claim 1, wherein the method further comprises:
   indicating, by an access stratum (AS) layer of the second communication device, third indication information to an upper layer of the second communication device, wherein the third indication information comprises third DRX configuration information between the second communication device and a third communication device.

9. A communication apparatus, comprising:
   a processor; and
   a non-transitory computer readable storage medium storing instructions that, when executed by the processor, cause the communication apparatus to perform operations including:
   determining first information, wherein the first information comprises at least one of first discontinuous reception (DRX) configuration information or first sidelink (SL) resource configuration information, and wherein the first information is associated with the communication apparatus;

sending, to a first communication device, the first information, the first information used for determining second DRX configuration information based on the first information; and receiving, from the first communication device, the second DRX configuration information, wherein the second DRX configuration information is between the first communication device and the communication apparatus, and wherein the second DRX configuration information is associated with the first information.

10. The communication apparatus according to claim 9, wherein the first DRX configuration information comprises at least one of first SL DRX configuration information or Uu DRX configuration information.

11. The communication apparatus according to claim 9, wherein the first DRX configuration information does not comprise the second DRX configuration information.

12. The communication apparatus according to claim 9, the operations further comprising:

receiving, from the first communication device, first indication information, wherein the first indication information indicates a manner in which the communication apparatus sends the first information, and wherein the manner comprises:

actively providing the first information to the first communication device, not actively providing the first information to the first communication device, or stopping providing the first information to the first communication device.

13. The communication apparatus according to claim 9, the operations further comprising:

receiving, from the first communication device, first request information, wherein the first request information requests the communication apparatus to send the first information to the first communication device.

14. The communication apparatus according to claim 9, wherein the communication apparatus communicates with the first communication device through a Uu interface, and the first DRX configuration information comprises one or more of:

fifth DRX configuration information of the communication apparatus or a third identifier, wherein the third identifier comprises a destination identifier, a source identifier, a link identifier, a connection identifier, a source identifier-destination identifier pair, a resource pool identifier, a configuration authorization identifier, or a service identifier corresponding to the fifth DRX configuration information.

15. The communication apparatus according to claim 9, wherein the communication apparatus sends the first information based on at least one of:

that the first information changes, or that a first timer expires or the first timer does not run.

16. The communication apparatus according to claim 9, the operations further comprising:

indicating, by an access stratum (AS) layer of the communication apparatus, third indication information to an upper layer of the communication apparatus, wherein the third indication information comprises third DRX configuration information between the communication apparatus and a third communication device.

17. A method applied to a second communication device or a chip of the second communication device, comprising:

determining that at least one of following conditions is met:

that first information changes, or that a first timer expires or the first timer does not run;

sending the first information, wherein the first information is used for determining second sidelink (SL) discontinuous reception (DRX) configuration information between a first communication device and the second communication device; and receiving, from the first communication device, the second SL DRX configuration information, wherein the second SL DRX configuration information is between the first communication device and the second communication device, and wherein the second SL DRX configuration information is associated with the first information.

18. The method according to claim 17, further comprising:

starting the first timer when the first information is sent to the first communication device or after the first information is sent to the first communication device.

* * * * *